United States Patent
Hamaguchi

(10) Patent No.: US 10,564,787 B2
(45) Date of Patent: Feb. 18, 2020

(54) TOUCH PANEL CONTROLLER, ELECTRONIC APPARATUS, CAPACITANCE DETECTION METHOD, AND POSITION DETECTION METHOD

(71) Applicant: SHARP KABUSHIKI KAISHA, Sakai, Osaka (JP)

(72) Inventor: Mutsumi Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/322,230

(22) PCT Filed: May 31, 2017

(86) PCT No.: PCT/JP2017/020178
§ 371 (c)(1),
(2) Date: Jan. 31, 2019

(87) PCT Pub. No.: WO2018/029948
PCT Pub. Date: Feb. 15, 2018

(65) Prior Publication Data
US 2019/0171314 A1    Jun. 6, 2019

(30) Foreign Application Priority Data

Aug. 10, 2016  (JP) ................. 2016-158163

(51) Int. Cl.
*G06F 3/044*  (2006.01)
*G06F 3/041*  (2006.01)

(52) U.S. Cl.
CPC ............ *G06F 3/044* (2013.01); *G06F 3/0412* (2013.01); *G06F 3/0416* (2013.01); *G06F 3/0443* (2019.05); *G06F 3/04166* (2019.05)

(58) Field of Classification Search
CPC .... G06F 3/0412; G06F 3/0416; G06F 3/0443; G06F 3/044; G06K 9/0002
See application file for complete search history.

(56) References Cited

U.S. PATENT DOCUMENTS 7,683,640 B2   3/2010 Chuang et al.
9,372,574 B2   6/2016 Kanazawa

FOREIGN PATENT DOCUMENTS

JP          5394540 B2   1/2014

*Primary Examiner* — Abbas I Abdulselam
(74) *Attorney, Agent, or Firm* — ScienBiziP, P.C.

(57) ABSTRACT

Sense lines in a self-capacitance touch panel are multiplexed. A touch panel controller (3) includes a drive circuit (4) that drives drive lines (D0 through D(K−1)), based on a drive code series, a code multiplication unit (11) that reads multiple linear sum signals along the sense lines (S0 through S(M−1)), based on the charges of detection electrodes (E) and performs an inner product computation with a detection code series, and a detection circuit (6) that detects a capacitance or a change in the capacitance.

11 Claims, 16 Drawing Sheets

$$M_a = \begin{pmatrix} -1 & -1 & -1 & -1 & -1 & -1 & 0 \\ -1 & -1 & -1 & -1 & -1 & -1 & 0 \\ -1 & -1 & -1 & -1 & -1 & -1 & 0 \end{pmatrix}$$

$$M_a^{-1} = \begin{pmatrix} 1 & 1 & 0 \\ 1 & 1 & 0 \\ 1 & 1 & 0 \\ 0 & 1 & 1 \\ 0 & 1 & 1 \\ 1 & 0 & 1 \\ 1 & 0 & 1 \\ 0 & 0 & 0 \end{pmatrix}$$

$$M_a \cdot M_a^{-1} = \begin{pmatrix} 2 & 2 & 0 & 0 & 0 & 0 & 0 \\ 2 & 2 & 0 & 0 & 0 & 0 & 0 \\ 0 & 0 & 2 & 2 & 0 & 0 & 0 \\ 0 & 0 & 2 & 2 & 0 & 0 & 0 \\ 0 & 0 & 0 & 2 & 2 & 0 & 0 \\ 0 & 0 & 0 & 0 & 2 & 2 & 0 \\ 0 & 0 & 0 & 0 & 0 & 0 & 0 \end{pmatrix}$$

(b)

$$M_b = \begin{pmatrix} 0 & -1 & -1 & -1 & -1 & -1 & -1 \\ 0 & -1 & -1 & -1 & -1 & -1 & -1 \\ 0 & -1 & -1 & -1 & -1 & -1 & -1 \end{pmatrix}$$

$$M_b^{-1} = \begin{pmatrix} 1 & 0 & 1 \\ 1 & 0 & 1 \\ 0 & 1 & 1 \\ 0 & 1 & 1 \\ 1 & 1 & 0 \\ 1 & 1 & 0 \\ 0 & 0 & 0 \end{pmatrix}$$

$$M_b \cdot M_b^{-1} = \begin{pmatrix} 0 & 0 & 0 & 0 & 0 & 2 & 2 \\ 0 & 0 & 0 & 0 & 2 & 2 & 0 \\ 0 & 0 & 0 & 2 & 2 & 0 & 0 \\ 0 & 0 & 0 & 2 & 2 & 0 & 0 \\ 0 & 2 & 2 & 0 & 0 & 0 & 0 \\ 0 & 2 & 2 & 0 & 0 & 0 & 0 \\ 0 & 0 & 0 & 0 & 0 & 0 & 0 \end{pmatrix}$$

$$Sa = \begin{pmatrix} 1 & 1 & 1 & 1 & 1 & 1 \\ 1 & -1 & 1 & -1 & 1 & -1 \\ 1 & 1 & -1 & -1 & 1 & 1 \\ 1 & -1 & -1 & 1 & 1 & -1 \\ 1 & 1 & 1 & 1 & -1 & -1 \\ 1 & -1 & 1 & -1 & -1 & 1 \\ 1 & 1 & -1 & -1 & -1 & -1 \\ 1 & -1 & -1 & 1 & -1 & 1 \end{pmatrix}$$

$$Dsa' = Sa \cdot D = \begin{pmatrix} 8.39 & 7.71 & -3.27 & -5.55 & 2.27 & 0.33 & 8.67 \\ -2.25 & -2.93 & -1.23 & 1.65 & 0.63 & 0.85 & 0.31 \\ 2.27 & 2.19 & 0.73 & -2.11 & -0.81 & 1.25 & 0.91 \\ -4.33 & -3.45 & 3.13 & 3.77 & -2.81 & 1.01 & -4.77 \end{pmatrix}$$

$$Sa^{-1} = \begin{pmatrix} 1 & 1 & 1 & 1 \\ 1 & -1 & 1 & -1 \\ 1 & 1 & -1 & -1 \\ 1 & -1 & -1 & 1 \\ 1 & 1 & 1 & 1 \\ 1 & -1 & 1 & -1 \\ 1 & 1 & -1 & -1 \\ 1 & -1 & -1 & 1 \end{pmatrix}$$

$$Sa^{-1} \cdot Dsa' = \begin{pmatrix} 4.08 & 3.52 & -0.64 & -2.24 & -0.72 & 3.44 & 5.12 \\ 4.08 & 3.52 & -0.64 & -2.24 & -0.72 & 3.44 & 5.12 \\ 17.24 & 16.28 & -4.44 & -13.08 & 3.64 & -0.28 & 14.04 \\ 17.24 & 16.28 & -4.44 & -13.08 & 3.64 & -0.28 & 14.04 \\ 8.20 & 6.04 & -8.36 & -5.56 & 6.52 & -1.08 & 12.84 \\ 8.20 & 6.04 & -8.36 & -5.56 & 6.52 & -1.08 & 12.84 \\ 4.04 & 5.00 & 0.36 & -1.32 & -0.36 & -0.76 & 2.68 \\ 4.04 & 5.00 & 0.36 & -1.32 & -0.36 & -0.76 & 2.68 \end{pmatrix}$$

$$Sa^{-1} \cdot Dsa' \cdot M^{-1} = \begin{pmatrix} 4.00 & 7.20 & 10.40 & 12.00 & 10.40 & 5.76 & 0.48 \\ 4.00 & 7.20 & 10.40 & 12.00 & 10.40 & 5.76 & 0.48 \\ 6.56 & 12.96 & 17.92 & 51.20 & 28.80 & 12.80 & 3.36 \\ 6.56 & 12.96 & 17.92 & 51.20 & 28.80 & 12.80 & 3.36 \\ 5.92 & 9.92 & 14.40 & 33.60 & 4.80 & 4.96 & 0.80 \\ 5.92 & 9.92 & 14.40 & 33.60 & 4.80 & 4.96 & 0.80 \\ 2.56 & 1.92 & 4.64 & 11.36 & 8.64 & 6.72 & 2.72 \\ 2.56 & 1.92 & 4.64 & 11.36 & 8.64 & 6.72 & 2.72 \end{pmatrix}$$

(b)

$$Sb = \begin{pmatrix} 1 & 1 & 1 & 1 & 1 & 1 \\ -1 & 1 & -1 & 1 & -1 & 1 \\ 1 & 1 & -1 & -1 & 1 & 1 \\ -1 & 1 & 1 & -1 & -1 & 1 \\ 1 & 1 & 1 & 1 & -1 & -1 \\ -1 & 1 & -1 & 1 & 1 & -1 \\ 1 & 1 & -1 & -1 & -1 & -1 \\ -1 & 1 & 1 & -1 & 1 & -1 \end{pmatrix}$$

$$Dsb' = Sb \cdot D = \begin{pmatrix} 8.39 & 7.71 & -3.27 & -5.55 & 2.27 & 0.33 & 8.67 \\ -0.83 & -0.03 & -0.09 & 0.35 & -0.15 & 0.03 & -0.35 \\ 4.11 & 3.23 & -1.35 & -3.71 & 1.19 & 0.69 & 3.23 \\ -2.15 & -2.19 & 3.11 & 1.87 & -2.43 & 1.99 & -3.47 \end{pmatrix}$$

$$Sb^{-1} = \begin{pmatrix} 1 & 1 & 1 & 1 \\ -1 & 1 & -1 & 1 \\ 1 & 1 & -1 & -1 \\ -1 & 1 & 1 & -1 \\ 1 & 1 & 1 & 1 \\ -1 & 1 & -1 & 1 \\ 1 & 1 & -1 & -1 \\ -1 & 1 & 1 & -1 \end{pmatrix}$$

$$Sb^{-1} \cdot Dsb' = \begin{pmatrix} 2.96 & 2.32 & 1.28 & -0.32 & -1.20 & 2.32 \\ 9.52 & 8.72 & -1.60 & -7.04 & 0.88 & 3.04 & 8.08 \\ 9.52 & 8.72 & -1.60 & -7.04 & 0.88 & 3.04 & 8.08 \\ 15.48 & 13.16 & -7.64 & -11.48 & 6.04 & -1.00 & 15.72 \\ 15.48 & 13.16 & -7.64 & -11.48 & 6.04 & -1.00 & 15.72 \\ 5.60 & 6.64 & -5.12 & -3.36 & 3.36 & -2.32 & 8.56 \\ 5.60 & 6.64 & -5.12 & -3.36 & 3.36 & -2.32 & 8.56 \\ 2.96 & 2.32 & 1.28 & -0.32 & -1.20 & 2.32 \end{pmatrix}$$

$$Sb^{-1} \cdot Dsb' \cdot M^{-1} = \begin{pmatrix} 2.40 & 4.00 & 6.56 & 6.40 & 8.16 & 5.60 & 2.72 \\ 5.60 & 10.40 & 13.60 & 27.20 & 19.68 & 8.16 & 1.76 \\ 5.60 & 10.40 & 13.60 & 27.20 & 19.68 & 8.16 & 1.76 \\ 6.72 & 13.12 & 18.72 & 50.40 & 20.00 & 9.76 & 2.40 \\ 6.72 & 13.12 & 18.72 & 50.40 & 20.00 & 9.76 & 2.40 \\ 4.32 & 4.48 & 8.48 & 24.16 & 4.80 & 6.72 & 0.48 \\ 4.32 & 4.48 & 8.48 & 24.16 & 4.80 & 6.72 & 0.48 \\ 2.40 & 4.00 & 6.56 & 6.40 & 8.16 & 5.60 & 2.72 \end{pmatrix}$$

$$S_a^{-1} \cdot S_a = \begin{pmatrix} 0 & 0 & 0 & 0 & 0 & 0 & 1 & 1 \\ 0 & 0 & 0 & 0 & 0 & 0 & 1 & 1 \\ 0 & 0 & 0 & 0 & 1 & 1 & 0 & 0 \\ 0 & 0 & 0 & 0 & 1 & 1 & 0 & 0 \\ 0 & 0 & 1 & 1 & 0 & 0 & 0 & 0 \\ 0 & 0 & 1 & 1 & 0 & 0 & 0 & 0 \\ 1 & 1 & 0 & 0 & 0 & 0 & 0 & 0 \\ 1 & 1 & 0 & 0 & 0 & 0 & 0 & 0 \end{pmatrix}$$

(b)

$$S_b^{-1} \cdot S_b = \begin{pmatrix} 1 & 0 & 0 & 0 & 0 & 0 & 0 & 1 \\ 0 & 0 & 0 & 0 & 0 & 1 & 1 & 0 \\ 0 & 0 & 0 & 0 & 0 & 1 & 1 & 0 \\ 0 & 0 & 0 & 1 & 1 & 0 & 0 & 0 \\ 0 & 0 & 0 & 1 & 1 & 0 & 0 & 0 \\ 0 & 1 & 1 & 0 & 0 & 0 & 0 & 0 \\ 0 & 1 & 1 & 0 & 0 & 0 & 0 & 0 \\ 1 & 0 & 0 & 0 & 0 & 0 & 0 & 1 \end{pmatrix}$$

FIG. 14

(a) $Sa \cdot Daa' = Sa \cdot Da \cdot Sa^{-1}$ ... $Sa^{-1} \cdot Daa'$ ... $Sa^{-1} \cdot Daa' \cdot Ma^{-1}$ (b) $Sa \cdot Dab' = Sa \cdot Db \cdot Sa^{-1}$ ... $Sa^{-1} \cdot Dab'$ ... $Sa^{-1} \cdot Dab' \cdot Mb^{-1}$ (c) $Sb \cdot Dba' = Sb \cdot Da \cdot Sb^{-1}$ ... $Sb^{-1} \cdot Dba'$ ... $Sb^{-1} \cdot Dba' \cdot Ma^{-1}$ (d) $Sb \cdot Dbb' = Sb \cdot Db \cdot Sb^{-1}$ ... $Sb^{-1} \cdot Dbb'$ ... $Sb^{-1} \cdot Dbb' \cdot Mb^{-1}$

TOUCH PANEL CONTROLLER, ELECTRONIC APPARATUS, CAPACITANCE DETECTION METHOD, AND POSITION DETECTION METHOD

TECHNICAL FIELD

The present invention relates to detection of a capacitance or detection of a change in the capacitance between an electrode and a touch detection target on a touch panel including multiple electrodes.

BACKGROUND ART

Patent Literature 1 discloses a touch panel controller that is intended to be used for a mutual-capacitance touch panel. The touch panel controller of Patent Literature 1 includes sense lines on the touch panel, and a code multiplication unit that functions as a connection interface for an operational amplifier that amplifies the output of the sense lines.

In the code multiplication unit disclosed in Patent Literature 1, some sense lines of multiple sense lines are connected to a non-inverting input of the operational amplifier, and the other sense lines are connected to an inverting input of the operational amplifier. In other words, according to Patent Literature 1, the sense lines are multiplexed such that the multiple sense lines correspond to the single operational amplifier.

Patent Literature 2 discloses a fingerprint sensor of a self-capacitance method. The fingerprint sensor of Patent Literature 2 includes a transistor that functions to charge a capacitance between an electrode and a finger, and a transistor that discharges the capacitance.

CITATION LIST

Patent Literature

PTL 1: Japanese Patent No. 5394540 (registered on Oct. 25, 2013)

PTL 2: U.S. Pat. No. 7,683,640 (registered on Mar. 23, 2010)

SUMMARY OF INVENTION

Technical Problem

A change in the capacitance between an electrode and a touch detection target on a self-capacitance touch panel is typically larger than a change in the capacitance on a mutual-capacitance touch panel. Since the self-capacitance touch panel is free from a drive (dedicated) electrode (hereinafter also referred to as a sensor line), the sensor line assigned to a drive (dedicated) sensor line on the mutual-capacitance touch panel is used for a sense electrode (hereinafter also referred to as a sense line). This leads to an increase in resolution, and an improvement in signal intensity (signal quality) in the self-capacitance touch panel.

However, in the reading of the self-capacitance method described below, outputs from an amplifier that amplifies an output of the sense electrode (sense line) partially include an undesired signal component (error).

The present invention is intended to detect a capacitance at a higher quality level (at a higher accuracy level) with a reduced effect of the error component by multiplexing the sense lines on the touch panel. The number of amplifiers for sense line outputs is also reduced by multiplexing the sense lines on the touch panel.

It is difficult to use, concerning the self-capacitance touch panel (such as the fingerprint sensor disclosed in PTL 2), a touch panel controller (such as the touch panel controller disclosed in PTL 1) that is not based on the assumption that the self-capacitance touch panel is used.

It is an object of the present invention to perform the capacitance detection at a higher quality level (a higher accuracy level) and further to reduce the number of amplifiers for sense line outputs by multiplexing the sense lines on the self-capacitance touch panel.

Solution to Problem

To solve the problem, a touch panel controller according to an aspect of the present invention is configured to control a touch panel that detects a capacitance or a change in the capacitance between multiple electrodes and a touch detection target, the electrodes being arranged at intersection points of multiple first signal lines and multiple second signal lines. The touch panel controller includes a drive circuit that turns on a first switch element between each of the electrodes and at least two of the first signal lines and drives the first signal lines multiple times in accordance with a first code series as a vector having elements of the number equal to the number of the first signal lines, a code multiplication unit that turns on a second switch element between each of the electrodes and corresponding one of the second signal lines, reads multiple linear sum signals responsive to charges of the electrodes along the second signal lines, and performs multiple times an inner product computation on a vector having as elements the linear sum signals and a second code series as a vector having elements of the number equal to the number of the second signal lines, and a detection circuit that detects the capacitance or the change in the capacitance by calculating a product of the inverse matrix of a matrix that is obtained by arranging vectors, each vector representing the second code series, a matrix that is obtained by arranging vectors, each vector including the multiple linear sum signals, and the inverse matrix of a matrix that is obtained by arranging vectors, each vector representing the first code series.

According to another aspect of the present invention, an electronic apparatus includes the touch panel controller.

According to another aspect of the present invention, a capacitance detection method detects a capacitance or a change in toe capacitance between multiple electrodes and a touch detection target, the electrodes being arranged at intersection points of multiple first signal lines and multiple second signal lines. The capacitance detection method includes a drive step of turning on a first switch element between each of the electrodes and at least two of the first signal lines and driving the first signal lines multiple times in accordance with a first code series as a vector having elements of the number equal to the number of the first signal lines, a code multiplication step of, subsequent to the drive step, turning on a second switch element between each of the electrodes and corresponding one of the second signal lines, reading multiple linear sum signals responsive to charges of the electrodes along the second signal lines, and performing multiple times an inner product computation on a vector having as elements the linear sum signals and a second code series as a vector having elements of the number equal to the number of the second signal lines, and a detection step of, subsequent to the code multiplication step, detecting the capacitance or the change in the capacitance by calculating a product of the inverse matrix of a matrix that is obtained by arranging vectors, each vector representing the second code series, a matrix that is obtained by arranging vectors, each vector including the multiple linear sum signals, and the inverse matrix of a matrix that is obtained by arranging vectors, each vector representing the first code series.

According to another aspect of the present invention, a position detection method detects a position of a touch detection target on a touch panel that detects a capacitance or a change in the capacitance between multiple electrodes and the touch detection target, the electrodes being arranged at intersection points of multiple first signal lines and multiple second signal lines. The position detection method includes the steps of the capacitance detection method, and a position detection step of detecting the position of the touch detection target on the touch panel in response to the capacitance or the change in the capacitance detected in the detection step.

Advantageous Effects of Invention

According to the aspects of the present invention, the touch panel system with the self-capacitance touch panel advantageously detects by using a simple configuration the capacitance or the change in the capacitance between the detection electrode of the touch panel and the touch detection target.

BRIEF DESCRIPTION OF DRAWINGS

FIG. 2 illustrates an example of matrices having as elements thereof drive codes in the touch panel system of FIG. 1 (is also referred to in the description of Embodiment 3).

FIG. 8 illustrates an example of matrices having as elements thereof detection codes used in a touch panel system of Embodiment 4.

FIG. 9 illustrates a product of a matrix having as elements thereof the detection codes of FIG. 8 and the inverse matrix of the matrix.

FIG. 10 illustrates an example of matrices having as elements thereof the drive codes used in a touch panel system of Embodiment 5.

FIG. 11 illustrates a product of a matrix having as elements thereof the drive codes of FIG. 10 and the inverse matrix of the matrix.

FIG. 12 illustrates an example of matrices having as elements thereof the detection codes used in a touch panel system of Embodiment 6.

FIG. 13 illustrates a product of a matrix having as elements thereof the detection codes of FIG. 12 and the inverse matrix of the matrix.

FIG. 14 illustrates an example of matrices having as elements thereof the drive codes used in a touch panel system of Embodiment 7 and matrices having as elements thereof the detection codes.

DESCRIPTION OF EMBODIMENTS

Embodiment 1

Configuration of Touch Panel System 1

Figure 1:
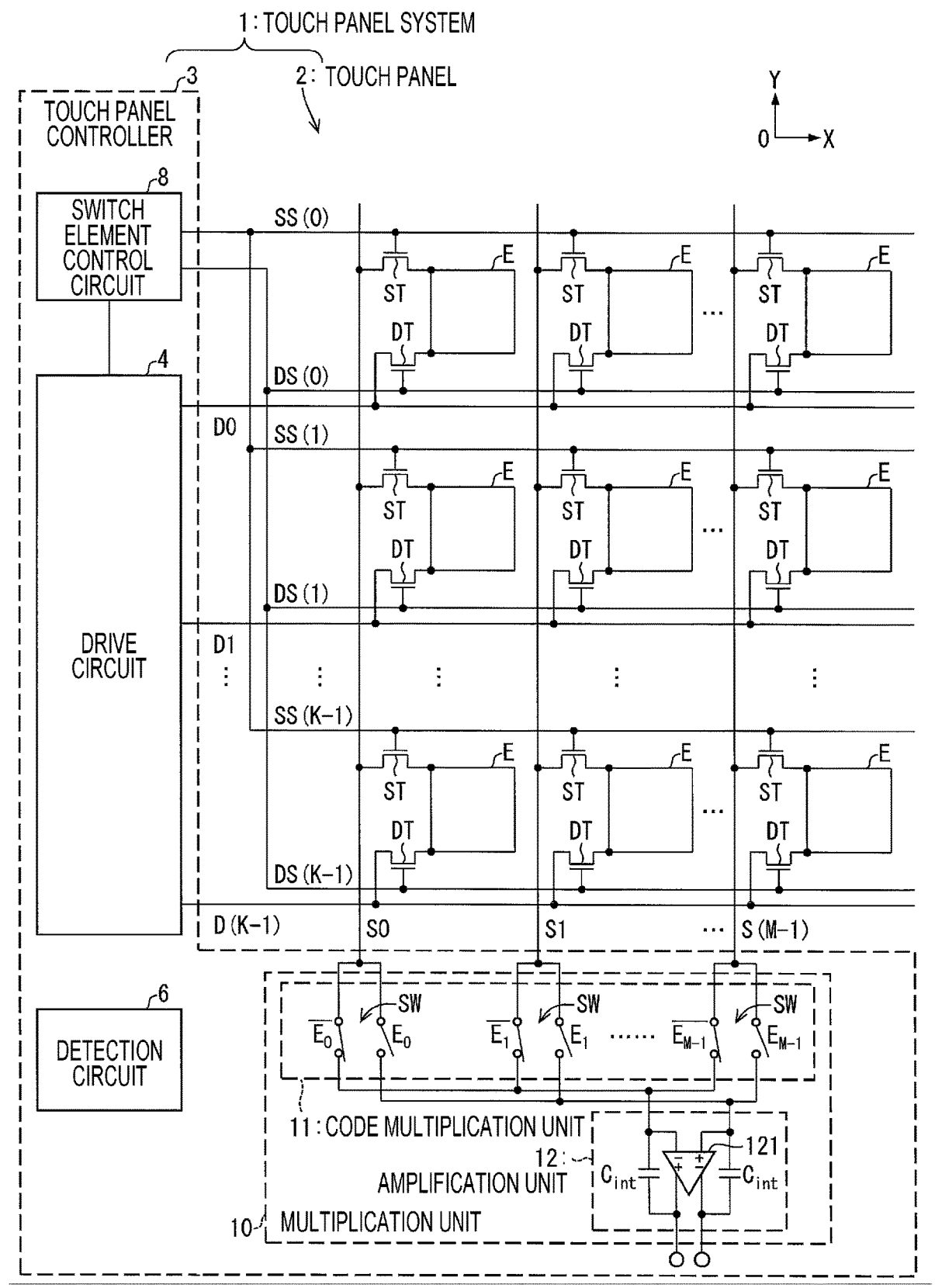
FIG. 1 is a circuit diagram illustrating the configuration of a touch panel system of Embodiment 1.

FIG. 1 is a circuit diagram illustrating the configuration of a touch panel system 1 of Embodiment 1. The touch panel system 1 includes a touch panel 2, and a touch panel controller 3 configured to control the touch panel 2.

The touch panel 2 includes K (K is plural) drive lines D0 through D(K−1) (first signal lines), M (K is plural) sense lines S0 through S(M−1) (second signal lines) mutually intersecting the K drive lines, and (K×M) detection electrodes E (electrodes) arranged at intersection points of the K drive lines D0 through D(K−1) and the K sense lines S0 through S(M−1) in a matrix.

The touch panel 2 includes K drive control lines DS0 through DS(K−1) and K sense control lines SS0 through SS(K−1) respectively corresponding to the drive lines D0 through D(K−1). A drive switch element DT (first switch element) is formed between each detection electrode E and the drive line corresponding to the detection electrode E. A sense switch element ST (second switch element) is formed between each detection electrode E and the corresponding sense line. Each of the drive switch element DT and the sense switch element ST includes transistors. The gate of each drive switch element DT is linked to the corresponding drive control line. The gate of each sense switch element ST is linked to the corresponding sense control line.

The touch panel 2 is arranged to detect a capacitance or a chance in the capacitance between each detection electrode E and a detection target (touch detection target), such as a finger or a pen.

The touch panel controller includes a drive circuit 4 connected to the K drive lines D0 through D (K−1), a switch element control circuit 8 connected to the K drive control lines DS0 through DS(K−1) and the K sense control lines SS0 through SS(K−1), a multiplication unit 10 connected to the sense lines S0 through S(M−1), and a detection circuit 6 that detects a touch of the detection target onto the touch panel 2 by detecting the capacitance or the change in the capacitance between each detection electrode E and the detection target in response to an output from the multiplication unit 10.

The multiplication unit 10 includes a code multiplication unit 11 and an amplification unit 12. The code multiplication unit 11 includes a switch element SW (third switch element) on each of the sense lines S0 through S(M−1). The amplification unit 12 includes an operational amplifier 121. An integral capacitance Cint is connected between the non-inverting input of the operational amplifer 121 and one output of the operational amplifier 121. An integral capacitance Cint is also connected between the inverting input of the operational amplifier 121 and the other output of the operational amplifier 121. The operational amplifier 121 may include a switch (not illustrated) that resets the state of the operational amplifier 121 by shorting one terminal of the integral capacitance Cint to the other terminal of the integral capacitance Cint.

Operation of Touch Panel System 1

In the touch panel system 1 thus constructed, the switch element control circuit turns on the (K×M) drive switch elements DT via the K drive control lines DS0 through DS(K−1), and turns off the (K×M) sense switch elements ST via the K sense control lines SS0 through SS(K−1).

The drive circuit 4 changes the potential of the drive line in response to a drive code (first code) having a value "+1" or "−1". If the drive code is "+1", the drive circuit 4 changes the potential of the drive line from a reference potential to a power source potential (first potential). If the drive code is "−1", the drive circuit 4 changes the potential of the drive line from the reference potential to a ground potential (second potential).

The driving of the drive line by the drive circuit 4 means that the drive circuit 4 changes the potential of the drive line. The drive circuit 4 performs parallel driving that is an operation of driving multiple drive lines in parallel. The drive circuit 4 also performs parallel driving multiple times in succession. In one cycle of the parallel driving, a drive code series (first code series) including multiple drive codes provided to multiple drive lines is used.

More specifically, the drive circuit 4 drives the K drive lines D0 through D(K−1) in response to a matrix of N rows and K columns including arranged drive code series, and charges or discharges each detection electrode E via each drive switch element DT to a power source voltage or a ground potential.

The switch element control circuit 8 turns off the (K×M) drive switch elements DT via the K drive control lines DS0 through DS(K−1), thereby setting each detection electrode E to a floating state. The switch element control circuit 8 then turns on the (K×M) sense switch elements ST via the K sense control lines SS0 through SS(K−1).

The code multiplication unit 11 performs a switch operation on the switch elements SW respectively connected to the sense lines S0 through S(M−1) in response to the detection codes $E_1$ through $E_{M-1}$ (second codes) which have a value "+1" or "−1". If the detection code Ei is "+1", the code multiplication unit 11 connects the sense line Si to the non-inverting input of the operational amplifier 121 of the amplification unit 12. If the detection code Ei is "−1", the code multiplication unit 11 connects the sense line Si to the inverting input of the operational amplifier 121 of the amplification unit 12. Here, i is one of the values 0 through M−1. More specifically, in the touch panel system 1, multiple sense lines are multiplexed in a manner such that the multiple sense lines correspond to a single operational amplifier. In a single multiplexing operation, a detection code series (second code series) including multiple detection codes that are multiplied by the multiple sense lines is used.

The amplification unit 12 amplifies a linear sum signal that is based on charges of the detection electrodes E read along the sense lines connected to the non-inverting input and the inverting input of the operational amplifier 121. In succession, the detection circuit 6 detects a capacitance or a change in the capacitance between each detection electrode E on the touch panel 2 and the detection target in response to the signal output from the amplification unit 12. The detection circuit 6 then detects the position of the detection target on the touch panel 2 in accordance with the detected capacitance or the detected change in the capacitance.

Specific Example of Drive Codes

Figure 2:
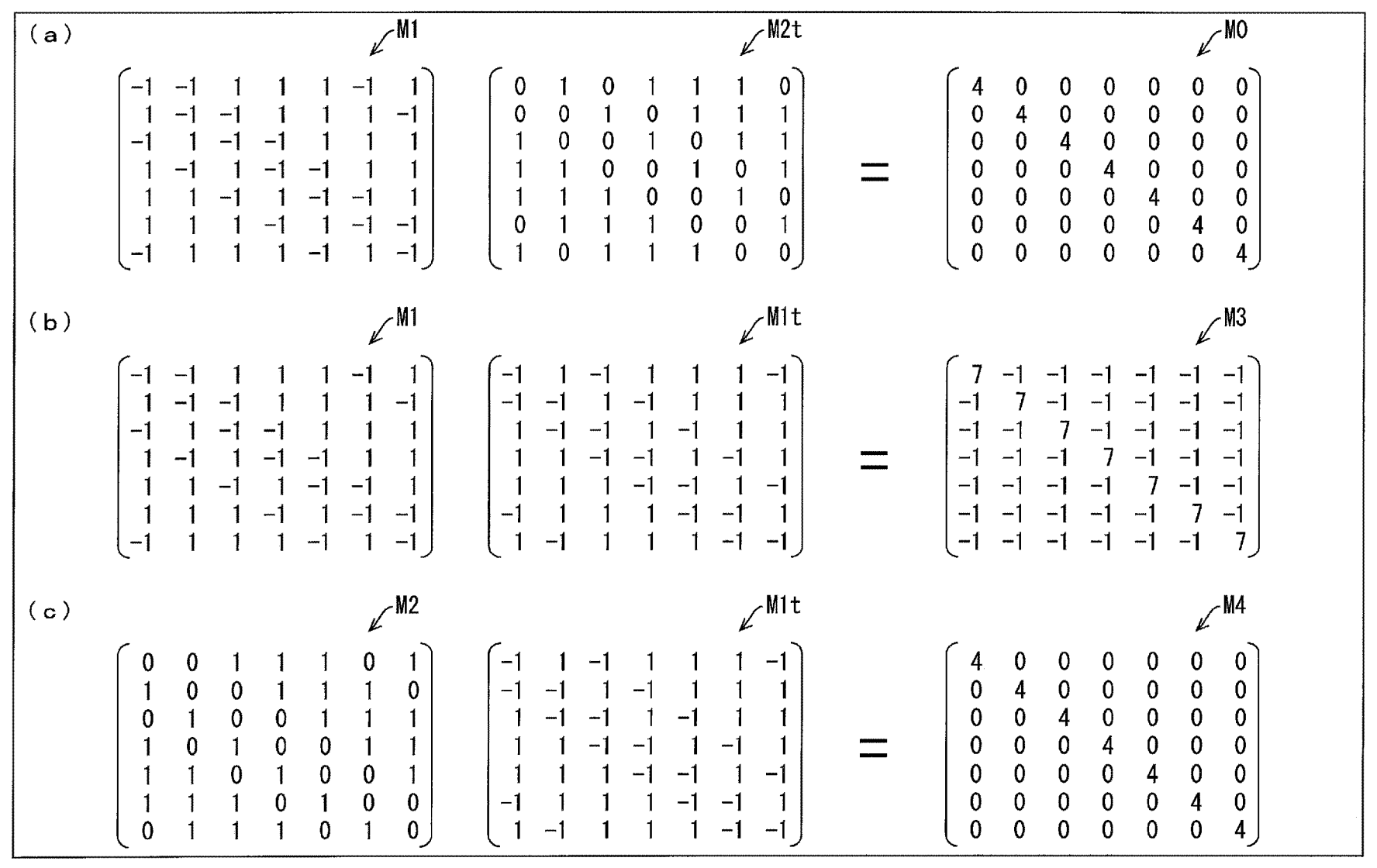

FIG. 2 illustrates examples of matrices having drive codes as the elements thereof in the touch panel system 1 of FIG. 1. FIGS. 2(*a*) and 2(*b*) illustrate examples of matrices having as the elements thereof the drive codes, each code being one of two values of +1/−1, and FIG. 2(*c*) illustrates an example of matrices having as the elements thereof the drive codes for driving with only +1.

FIG. 2(*a*) illustrates a matrix M1 having as the elements thereof the drive codes of two values of "+1" and "−1" with which the drive circuit 4 drives seven drive lines D0 through D6, a matrix M2*t* that is obtained by transposing a matrix M2 that is described below and is used to compute an inner product with the linear sum signal that is used by the detection circuit 6 for decoding, and a matrix M0 that is the computation result of the inner product of the matrix M1 and the matrix M2*t*. Series including elements in a row vector and a column vector of the matrix M1 are M series.

FIG. 2(*b*) illustrates the matrix M1, a matrix M1*t* that is obtained by transposing the matrix M1 and is used in computing the inner product with the linear sum signal that is used in the detection circuit 6 for decoding, and a matrix M3 that is the computation result of the inner product of the matrix M1 and the matrix M1*t*.

FIG. 2(*c*) illustrates a matrix M2 when the drive circuit 4 drives the drive lines D0 through D6 with "+1" only, the matrix M1*t*, and a matrix M4 that is the computation result of the inner product of the matrix M2 and the matrix M1*t*.

Capacitance Detection Computation

Figure 3:
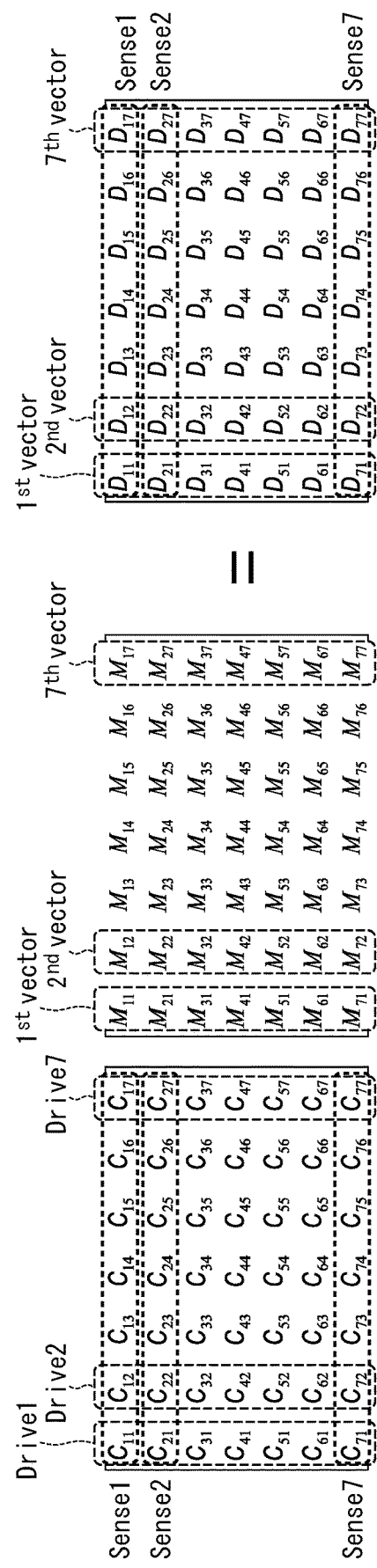
FIG. 3 is a schematic diagram illustrating a capacitance detection computation using drive codes in the touch panel system of FIG. 1.

FIG. 3 is a schematic diagram illustrating a capacitance detection computation using drive codes in the touch panel system 1 of FIG. 1. In the following discussion, i and j takes one of the values 1 through 7.

The row vector at the i-th row of a matrix C is labeled "Sense i". The column vector at the j-th column of the matrix C is labeled "Drive j". An element $C_{ij}$ at the i-th row and j-th column of the matrix C is a value of a capacitance between the detection electrode E located at the intersection point of a sense line S(i−1) and a drive line D(j−1) and the detection target on the touch panel 2 as illustrated in FIG. 1.

A column vector at the j-th column of the matrix M is labeled "$j^{th}$ vector". An element $M_{ij}$ at the i-th row and the j-th column of the matrix M is a drive code with which the drive circuit 4 of FIG. 1 drives a drive line D(i−1) in j-th parallel driving as illustrated in FIG. 1.

Series including the elements of a row vector and a column vector of the matrix M are referred to as M series. The element $M_{ij}$ is determined such that the inverse matrix of the matrix M is a transposed matrix of the matrix M.

A row vector at the i-th row of a matrix D is labeled "Sense i". A column vector at a j-th column of the matrix D is labeled "$j^{th}$ vector". An element $D_{ij}$ at the i-th row and the j-th column of the matrix D is a linear sum signal that is obtained from the sense line S(i−1) when the drive circuit 4 of FIG. 1 drives the drive lines D0 through D6 in j-th parallel driving.

The element $D_{ij}$, the element $C_{ij}$, and the element $M_{ij}$ satisfy the following equation. In the following equation, Σ means the sum with respect to a variable k.

$$D_{ij} = \Sigma C_{ik} M_{kj}$$

Computation is performed in accordance with the following equations to determine the matrix C.

$$CM=D$$

$$C(MM^{-1})=DM^{-1}$$

$$C=DM^{-1}$$

(Capacitance Detection Computation with the Sense Lines Multiplexed)

Figure 4:
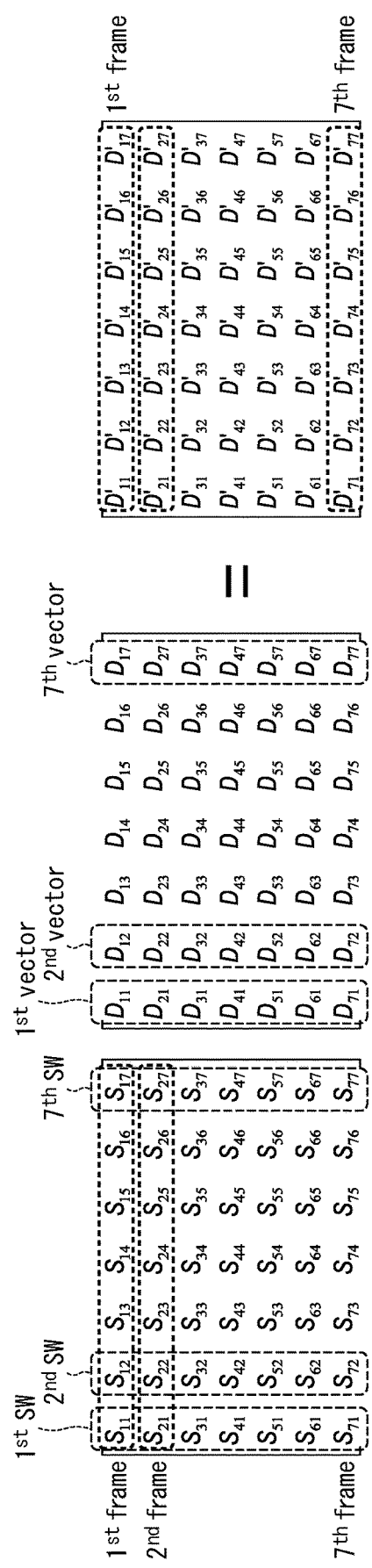
FIG. 4 is a schematic diagram illustrating the capacitance detection computation using drive codes and detection codes in the touch panel system of FIG. 1.

FIG. 4 is a schematic diagram illustrating the capacitance detection computation using the drive codes and the detection codes in the touch panel system 1 of FIG. 1.

A row vector at the i-th row of a matrix S is labeled "$i^{th}$ frame". A column vector at the j-th column of the matrix S is labeled "$i^{th}$ SW". An element $S_{ij}$ at the i-th row and the j-th column of the matrix S is a detection code that is used when the code multiplication unit 11 of FIG. 1 multiplexes the sense line S0 through S6 at an i-th operation. The matrix S is a matrix of the detection code series being arranged.

A row vector at the i-th column of a matrix D' is labeled "$i^{th}$ frame". The element $D'_{ij}$ of the matrix D' is a value actually obtained by the amplification unit 12 as illustrated in FIG. 1. More specifically, the element $D'_{ij}$ is the value of a signal that the operational amplifier 121 in the amplification unit 12 outputs when the drive circuit 4 drives the drive lines D0 through D6 in the j-th parallel driving and the code multiplication unit 11 multiplexes the sense line S0 through S6 at the i-th operation. The value of the signal may be a digital signal as a result of analog-to-digital (AD) conversion.

The element $D'_{ij}$, the element $S_{ij}$, and the element $D_{ij}$ satisfy the relationship expressed by the following equation. In the following equation, $\Sigma$ means the sum with respect to the variable k. In this case, k takes any of the values 0 through 6.

$$D'_{ij}=\Sigma S_{ik}D_{kj}$$

Computation is performed in accordance with the following equations to determine the matrix C representing capacitance distribution. As illustrated in FIG. 4, SD is defined to be SD=D'.

$$SCM=SD$$

$$SCM=D'$$

$$(S^{-1}S)C(M\,M^{-1})=S^{-1}D'M^{-1}$$

$$C=S^{-1}D'M^{-1}$$

(Output of the Amplification Unit 12)

Figure 5:
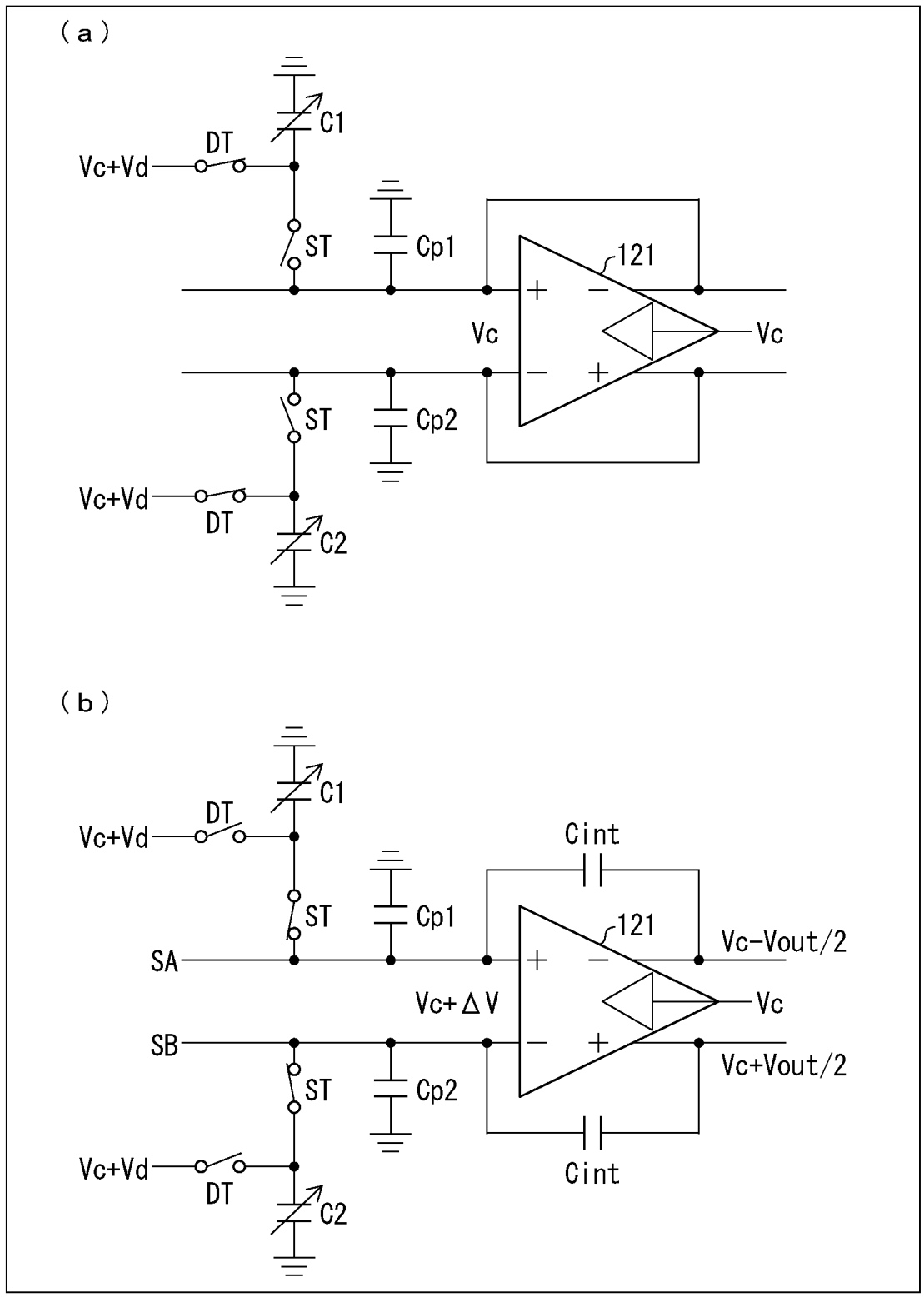
FIG. 5 is a circuit diagram Illustrating the operation of an amplification unit in the touch panel system of FIG. 1.

FIG. 5 is a circuit diagram indicating the operation of the amplification unit 12 in the touch panel system 1 of FIG. 1.

A capacitance C1 represents a capacitance formed between the detection electrode E connected to the non-inverting input of the operational amplifier 121 via the sense switch element ST and the detection target. A capacitance C2 represents a capacitance formed between the detection electrode E connected to the inverting input of the operational amplifier 121 via the sense switch element ST and the detection target.

The capacitances C1 and C2 are variable capacitances. This means that the capacitance between the detection electrode E and the detection target may vary in response to a change in the distance between the detection electrode E and the detection target. Capacitances Cp1 and Cp2 represent capacitances present between the sense line and the AC ground, and thus mean parasitic capacitances.

A voltage Vc is a reference voltage of the operational amplifier 121. The reference voltage Vc is half as high as a power source voltage, for example. A voltage (Vc+Vd) is a voltage that is applied to the crave line when the crave circuit 4 drives the drive line. A voltage Vout is output by the operational amplifier 121.

Referring to FIG. 5(a), the drive switch element DT is closed. The sense switch element ST is open. Accordingly, the capacitances C1 and C2 are supplied with and thus charged by the voltage (Vc+Vd). The integral capacitance Cint is shorted.

Referring to FIG. 5(b), the drive switch element DT is open. The sense switch element ST is closed.

The charge stored at the non-inverting input (+) of the operational amplifier 121 leads to equation (1). Also, the charge stored at the inverting input (−) of the operational amplifier 121 leads equation (2).

$$C1(Vc+Vd)+Cp1\cdot Vc=(C1+Cp1)(Vc+\Delta V)+Cint(\Delta V+Vout/2) \quad \text{(Equation 1)}$$

$$C2(Vc+Vd)+Cp2\cdot Vc=(C2+Cp2)(Vc+\Delta V)+Cint(\Delta V-Vout/2) \quad \text{(Equation 2)}$$

Equations (1) and (2) lead to the following equations.

$$\Delta V=(C1+C2)Vd/(C1+C2+Cp1+Cp2+2\cdot Cint)$$

$$Vout=\{(C1-C2)(Vd-\Delta V)-(Cp1-Cp2)\Delta V\}/Cint$$

If $\Delta V$ is sufficiently smaller than Vd, the following output is obtained.

$$Vout=(C1-C2)Vd/Cint$$

If $\Delta V$ is not sufficiently smaller than Vd, the voltage Vout output by the operational amplifier 121 varies if $\Delta V$ varies in response to a variation in at least one of C1, C2, Cp1, and Cp2 even with the value (C1-C2) being constant. From the above, $\Delta V$ serves as a factor that causes a component (error) that is not a desired signal component.

Effects of the Embodiment

If the touch panel 2 including the detection electrodes E each arranged with the drive switch element DT and the sense switch element ST is craven in parallel, the touch panel 2 may be scanned in a short period of time with a simple structure. By controlling the switch element SW in the code multiplication unit 11 in addition to the drive switch element DT and the sense switch element ST, the sense lines are multiplexed. The number of amplifier elements to amplify the sense line signal may thus be reduced.

The amplifier element may be disposed beneath the detection electrode E on the touch panel, for example. By reducing the number of amplifier elements, a chip having a capacitance detection computation function or the like may be disposed beneath the detection electrode E. The touch panel system may thus have a simpler structure than that of the related art.

The touch panel system including the self-capacitance touch panel uses a switch element to charge and discharge the detection electrode. The touch panel system 1 includes the touch panel having the drive switch element DT and the sense switch element ST, and has thus a larger number of switch elements than a touch panel system including a mutual-capacitance touch panel. However, the switch element is simpler in structure than the amplifier element. Thus, the effect of simple structure of the touch panel system achieved by the reduction in the number of amplifier elements is more advantageous than the effect of complex structure of the touch panel system achieved by the increase in the number of switch elements. Accordingly, the touch panel system is simpler in structure than that of the related art.

Since the self-capacitance touch panel system is free from the drive (dedicated) electrode as the electrodes of the touch panel, all the electrodes are used as the detection electrodes. Since the mutual-capacitance system uses the drive (dedicated) electrodes and the detection electrodes, the electrode group of odd-numbered rows (controlled by DS0, DS2, DS4, . . . ) operate as the drive (dedicated) electrodes, and the electrode group of even-numbered rows (controlled by SS1, SS3, SS5, . . . ) operate as the detection electrodes as illustrated in FIG. 1. This means that half the electrodes operate as the drive (dedicated) electrodes, and the remaining half of the electrodes operate as the detection electrodes. The self-capacitance system, which uses all the electrodes as the detection electrodes, has twice the number of detection electrodes of the mutual-capacitance system (has high resolution). If viewed from a different angle, the size (area) of the detection electrodes is interpreted to be twice as large. Generally, as the size of electrodes increases, signal intensity becomes higher. Capacitance detection at a higher quality (accuracy) level may be performed.

The touch panel system with the self-capacitance touch panel detects, with a simple structure thereof, a capacitance or a change in the capacitance between the detection electrode and the touch detection target on the touch panel.

Switch

Figure 16:
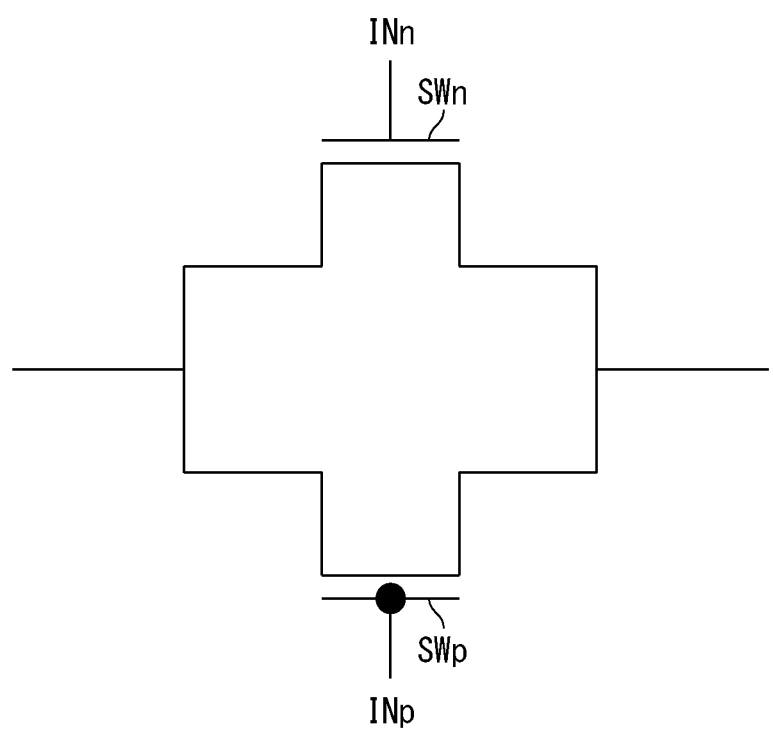
FIG. 16 is a schematic diagram illustrating the configuration of a sense switch element, a drive switch element, and a switch element in the touch panel system of FIG. 1.

FIG. 16 is a schematic diagram illustrating an exemplary configuration of the sense switch element ST, the drive switch element DT, and the switch element SW in the touch panel system 1 of FIG. 1. At least one of the sense switch element ST, the drive switch element DT, and the switch element SW includes an N-type transistor SWn and a P-type transistor SWp identical to each other in size.

Referring to FIG. 16, the source terminal of the N-type transistor SWn is connected to the source terminal of the P-type transistor SWp. Furthermore, the drain terminal of the N-type transistor SWn is connected to the drain terminal of the P-type transistor SWp.

Control signals mutually opposite in polarity are respectively applied to the gate terminal of the N-type transistor SWn and the gate terminal of the P-type transistor SWp.

In this configuration, noises attributed to ON/OFF of the switch element cancel each other.

Fingerprint Sensor

The touch panel controller 3 is appropriate for a fingerprint sensor that needs to be compact and needs higher resolution. When the fingerprint sensor is used, a user typically touches a finger receiving structure grounded such that finger serving as a touch detection target is grounded. Accordingly, a noise superimposed on the linear sum signal read from the sense lines is reduced. This configuration works beneficially in the multiplexing of the sense lines.

Capacitance Detection Method and Position Detection Method

A capacitance detection method including a drive step to perform the functionality of the drive circuit 4, a code multiplication step to perform the functionality of the code multiplication unit 11, and a detection step to perform part of the functionality of the detection circuit 6 falls within the present invention. A position detection method including the steps of the capacitance detection method, and a position detection step to perform the functionality of the detection circuit 6, namely, a position detection step to detect the position of the touch detection target on the touch panel 2, based on the capacitance or the change in the capacitance detected in the detection step falls within the present invention.

Embodiment 2

Elements identical in functionality to the elements described above are designated with the same reference symbols and the discussion thereof is omitted herein.

Configuration Free from Offset Canceling

Figure 6:
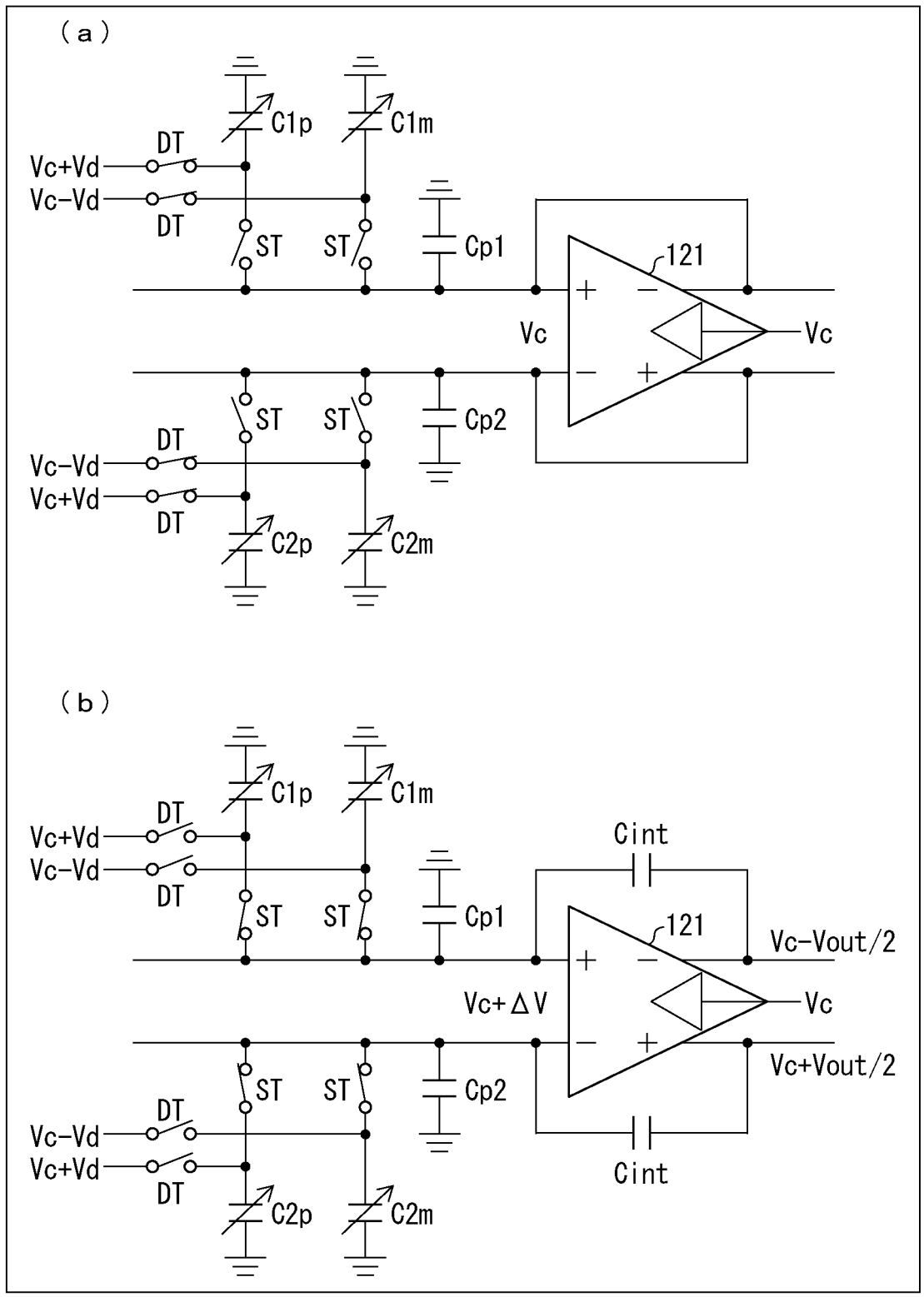
FIG. 6 is a circuit diagram Illustrating the operation of the amplification unit different from the operation illustrated in FIG. 5.

FIG. 6 is a circuit diagram illustrating the operation of the amplification unit 12 different from the operation illustrated in FIG. 5.

Capacitances $C1p$ and $C1m$ represent capacitances formed between the detection electrode E connected to the non-inverting input of the operational amplifier 121 via the sense switch element ST and the detection target. Capacitances $C2p$ and $C2m$ represent capacitances formed between the detection electrode E connected to the inverting input of the operational amplifier 121 via the sense switch element ST and the detection target.

The capacitances $C1p$, $C1m$, $C2p$, and $C2m$ are variable in value. This means that the capacitance between the detection electrode E and the detection target varies in response to a change in the distance between the detection electrode E and the detection target.

A voltage $(Vc+Vd)$ is a voltage that is applied to the drive line when the drive circuit 4 drives the drive line with a drive code "+1". A voltage $(Vc-Vd)$ is a voltage that is applied to the drive line when the drive circuit 4 drives the drive line with a drive code "−1".

Referring to FIG. 6($a$), the drive switch element DT is closed. The sense switch element ST is open. Accordingly, the voltage $(Vc+Vd)$ is applied to and thus charges the capacitances $C1p$ and $C2p$. Furthermore, the voltage $(Vc-Vd)$ is applied to and thus charges the capacitances $C1m$ and $C2m$. The integral capacitance Cint is shorted.

Referring to FIG. 6($b$), the drive switch element DT is open. The sense switch element ST is closed. As a result, voltage $(Vc+\Delta V)$ is applied to the operational amplifier 121.

The charge storage at the non-inverting input (+) of the operational amplifier 121 leads to equation (3). The charge storage at the inverting unit (−) of the operational amplifier 121 leads to equation (4).

$$C1p(Vc+Vd)+C1m(Vc-Vd)+Cp1 \cdot Vc = (C1p+C1m+Cp1)(Vc+\Delta V)+\text{Cint}(\Delta V-Vout/2) \quad \text{(Equation 3)}$$

$$C2p(Vc+Vd)+C2m(Vc-Vd)+Cp2 \cdot Vc = (C2p+C2m+Cp2)(Vc+\Delta V)+\text{Cint}(\Delta V-Vout/2) \quad \text{(Equation 4)}$$

Equations 3 and 4 lead to equations 5 and 6.

$$\Delta V = \{(C1p-C1m)+(C2p-C2m)\}/(C1p+C1m+Cp1+C2p+C2m+Cp2+2\cdot\text{Cint})*Vd \quad \text{(Equation 5)}$$

$$Vout = \{(C1p-C2p)(Vd-\Delta V)-(C1m-C2m)(Vd+\Delta V)-(Cp1-Cp2)\Delta V\}/\text{Cint} \quad \text{(Equation 6)}$$

If $\Delta V$ is sufficiently smaller than $Vd$, the following output is obtained.

$$Vout = \{(C1p-C2p)-(C1m-C2m)\}Vd/\text{Cint}$$

As expressed by equation 6, $\Delta V$ is a factor that causes a component (error) that is not a desired signal component. The operation of $\Delta V$ with the sense lines multiplexed is thus studied. The multiplexing of the sense lines means an increase in the number of sensor lines for sensing. For example, if the number of sensor lines is doubled, each of $C1p$, $C1m$, $C2p$, and $C2m$ is generally doubled. This means that the denominator of equation 5 reaches a value approximately twice as large at maximum. On the other hand, generally, $(C1p-C1m)+(C2p-C2m)$ does not reach a value twice as large even if the sensor lines for sensing are doubled. In particular, when highly random codes (such as M series codes) are used for drive codes, $(C1p-C1m)$ and $(C2p-C2m)$ becomes closer to zero. In other words, the multiplexing of the sense lines typically causes $\Delta V$ to be smaller in value, leading to a smaller effect of error.

The longer code length of the drive codes in use means that $C1p$, $C1m$, $C2p$, and $C2m$ become larger. As the code length of the drive codes in use becomes longer, the tendency that $\Delta V$ becomes smaller than $V_d$ is more pronounced.

Configuration and Effects of Performing Offset Canceling

The following relation holds true if the capacitance $C1p$ is higher than the capacitance $C1m$ in FIG. 6(b). In the following equation, Cdiff represents a difference between the capacitance $C1p$ and the capacitance $C1m$.

$$C1p<C1m(C1p-C1m=\text{Cdiff}) \quad \text{(Equation 7)}$$

Figure 7:
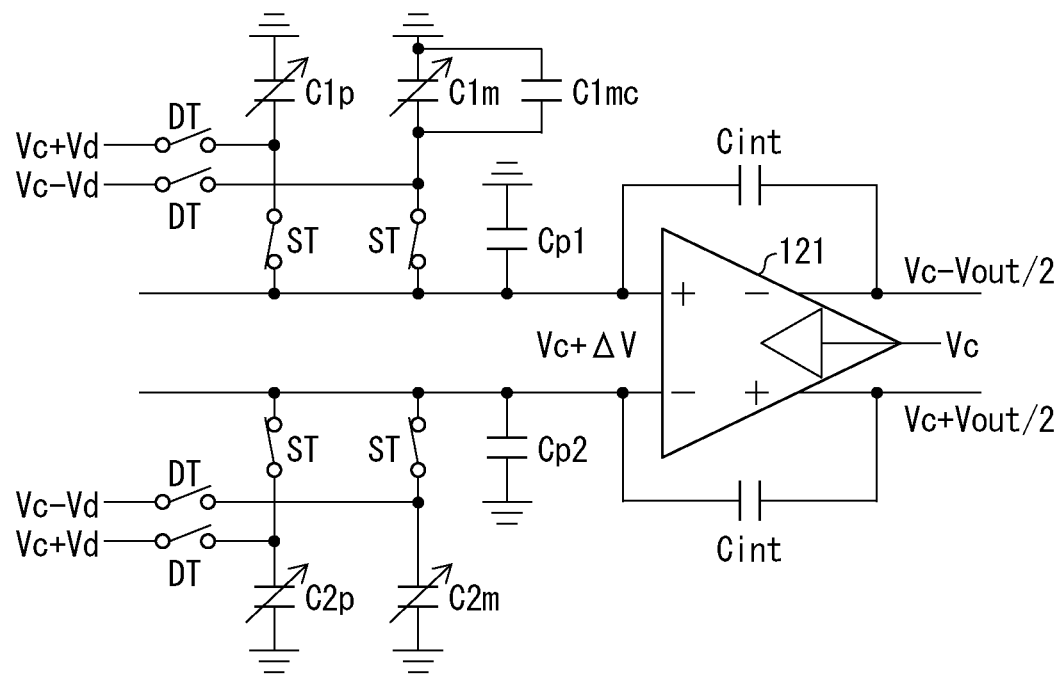
FIG. 7 is a circuit diagram illustrating the operation of an amplification unit in a touch panel system of Embodiment 2 when offset canceling is performed.

FIG. 7 is a circuit diagram illustrating the operation of the amplification unit 12 in the touch panel system 1 of the embodiment when offset canceling is performed. Referring to FIG. 7, a capacitance $C1mc$ is connected in parallel with the capacitance $C1m$. The location where the capacitance $C1mc$ is mounted actually is not necessarily on the touch panel, and the capacitance $C1mc$ may be mounted at a location where an equivalent circuit operation is enabled. For example, the capacitance $C1mc$ may be mounted close to the amplification unit 12. In that case, equation 5 and equation 6 are re-written as follows:

$$\Delta V=\{(C1p-(C1m+C1mc))+(C2p-C2m)\}/(C1p+(C1m+C1mc)+Cp1+Cp2+C2m+Cp2+2\cdot\text{Cint})*V$$

$$V_{out}=\{(C1p-C2p)(V_d-\Delta V)-((C1m+C1mc)-C2m)(V_d+\Delta V)-(Cp1-Cp2)\Delta V\}/\text{Cint}$$

If the relationship of equation 7 is determined in advance by referring to the features of the drive codes and the results of measurements performed in advance, the capacitance $C1mc$ is set to be approximately equal to Cdiff of equation 7, and thus the signal component in the output of the amplification unit 12 caused by fixed capacitances (such as Cp1 and Cp2) is suppressed. The dynamic range of the output of the amplification unit 12 is thus increased.

Embodiment 3

Configuration and Effect to Control Saturation Balance of Drive Codes

"Saturation" is intended to mean the state that the level of the signal output from the amplification unit 12 remains unchanged even if the level of the signal input to the amplification unit 12 from the sense line increases.

In the matrix M1 having as the elements thereof the drive codes in the M series of 7 rows×7 columns described with reference to FIGS. 2(a) and 2(b), the number of elements "1" is four, and the number of elements "-1" is three at each of the first column to the seventh column, and the difference in number between the two is one. Accordingly, the matrix M1 is always generally well-balanced between the elements "1" and the elements "-1". The most well-balanced state of the matrix M1 is that the number of elements "1" is equal to the number of elements "-1" with the difference between the numbers of the two being 0.

Since the matrix M1 is generally well-balanced with respect to potentials that drive multiple drive lines, saturation is controlled. In this way, the configuration that uses the drive codes with the well-balanced numbers of the elements falls within the present invention. Note that the number of elements of drive codes (code length) is not limited to the example of the embodiment.

Number of Drive Lines to Balance Drive Codes

If the touch panel 2 includes eight drive lines, it is difficult to drive all eight lines at the same time because the matrix M1 has a structure of 7 row×7 columns. If the balance between the number of elements "1" and the number of elements "-1" in the code series has a higher priority, the following option may be available. The seven drive lines of D0 through D6 are driven by the matrix M1 at a first timing, and the capacitance distribution corresponding to the drive lines D0 through D6 is obtained, and then the seven drive lines of D1 through D7 are driven by the matrix M1 at a next timing, and the capacitance distribution corresponding to the drive lines D1 through D7 is obtained. The results are then combined to obtain the capacitance distribution corresponding to the eight drive lines D0 through D7.

The configuration using the number of drive lines that balance the number of elements as the drive codes falls within the present invention. The number of drive lines in use is not limited to the example of the embodiment.

Gain of Amplification Unit 12

The gain that is a ratio of the output of the amplification unit 12 to the input of the amplification unit 12 is inversely proportional to the integral capacitance Cint of the operational amplifier 121 included in the amplification unit. Accordingly, saturation is controlled by reducing the gain of the amplification unit 12 with the integral capacitance Cint increased. In the capacitance detection computation, more accurate capacitance detection is enabled by correcting, with respect to the drive codes, an update component in the gain of the amplification unit 12 involved in the update of the integral capacitance Cint.

The method of reflecting the results caused by the update of the integral capacitance Cint on the drive codes falls within the present invention.

Embodiment 4

Configuration to Remove Effects of Detection Codes Subject to Saturation

Figure 8:
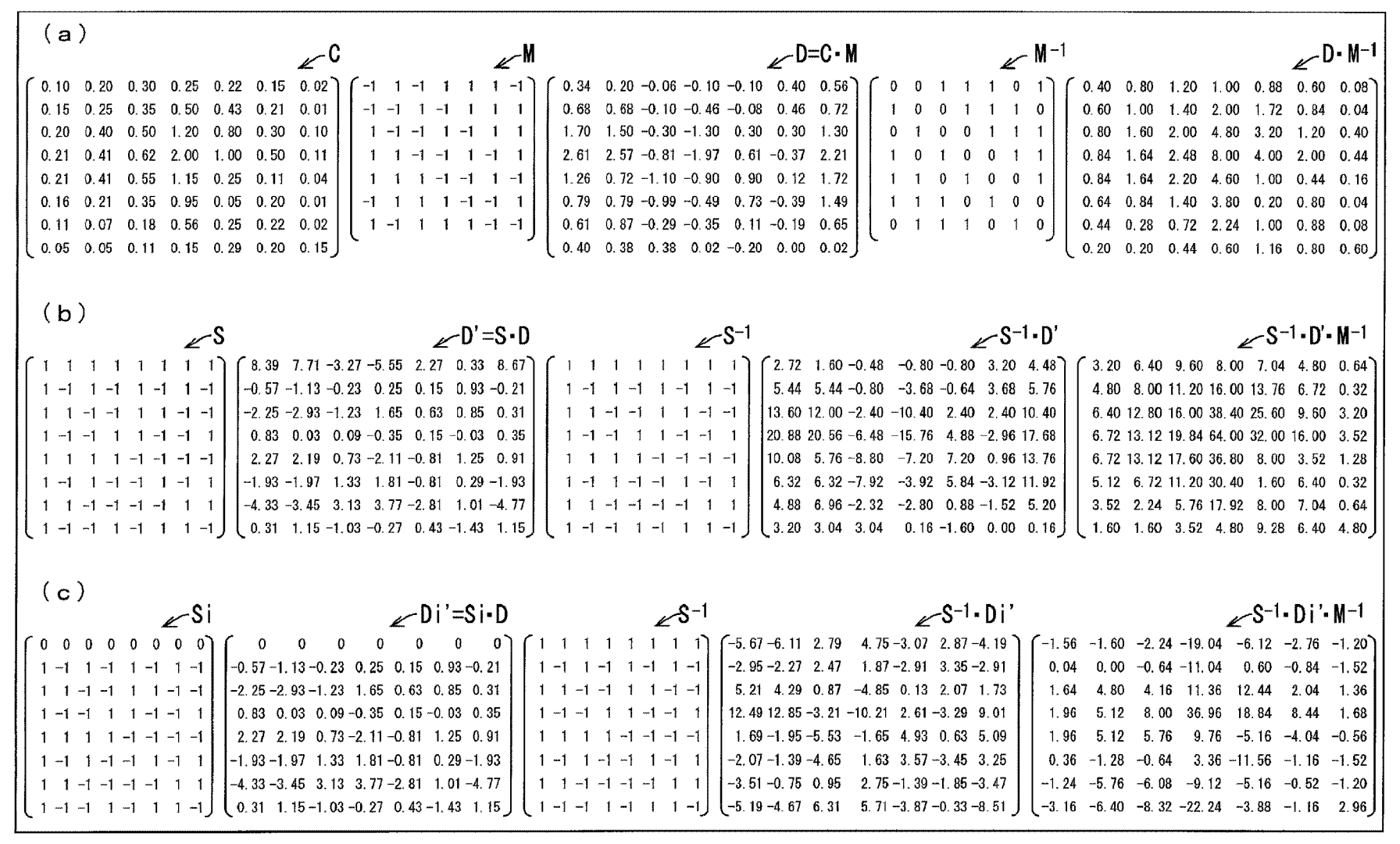

FIG. 8 illustrates matrices having, as elements, detection codes used by the touch panel system 1 of Embodiment 4. In the following discussion, an "inverse matrix" $A^{-1}$ of a matrix A is intended to mean that the product of the matrix A and the inverse matrix $A^{-1}$ is a scalar multiple of a unit matrix.

FIG. 8(a) illustrates a matrix C having the elements thereof capacitances between the detection electrodes E and the detection target, a matrix M having as the elements thereof the drive codes, a matrix D having as the elements thereof the linear sum signals obtained from sense lines S0 through S(M−1), the inverse matrix $M^{-1}$ of the matrix M, and the product of the matrix D and the inverse matrix $M^{-1}$.

The product of the matrix D and the inverse matrix $M^{-1}$ illustrated in FIG. 8(a) corresponds to the matrix C, namely, the detected capacitance distribution. The product (signal components) is four times as large as the matrix C through the parallel driving of the drive lines (matrix M).

FIG. 8(b) illustrates a matrix S having as the elements thereof the detection codes, a matrix D' having as the elements thereof outputs of the amplification unit 12, the inverse matrix $S^{-1}$ of the matrix S, the product of the inverse matrix $S^{-1}$ and the matrix D', and the product of the inverse matrix $S^{-1}$, the matrix D', and the inverse matrix $M^{-1}$.

The product of the inverse matrix the matrix D', and the inverse matrix $M^{-1}$ illustrated in FIG. 8(b) is 32 times as large as the matrix C. This is because the product is obtained through 4 time multiplication of the matrix C through the parallel driving of the drive lines (matrix M), and is further 8 time multiplication of the matrix C through the multiplexing of the sense lines (matrix S).

FIG. 8(c) illustrates examples of a matrix Si having as the elements thereof detection codes different from those of the matrix S, a matrix Di' having as the elements thereof the outputs of the amplification unit 12 obtained when the sense lines are multiplexed using the detection codes of the matrix Si, the inverse matrix $S^{-1}$ of the matrix S, the product of the inverse matrix $S^{-1}$ and the matrix Di', and the product of the inverse matrix $S^{-1}$, the matrix Di', and the inverse matrix $M^{-1}$.

Referring to FIG. 8(b), the elements of the first row vector and the first column vector of the matrix S are "1". For example, such a setting is achieved if a Hadamard matrix is used as the matrix S. Referring to FIG. 8(c), the elements at the first row vector of the matrix Si are "0".

Each row vector of the matrix S includes as the elements the detection codes that are used in one cycle of multiplexing of the sense lines. In the multiplexing of the sense lines using the first row vector of the matrix S, the code multiplication unit 11 connects the sense line S0 through S7 to the non-inverting input of the operational amplifier 121. Because of this, the level of the signal output from the amplification unit 12 becomes higher, possibly leading to the saturation.

On the other hand, in the multiplexing of the sense lines using the first row vector of the matrix Si, the code multiplication unit 11 neither connects the sense line S0 through S7 to the non-inverting input of the operational amplifier 121 nor connects the sense line S0 through S7 to the inverting input of the operational amplifier 121. Accordingly, the saturation of the amplification unit 12 is controlled by using the matrix Si.

It will be understood that the matrix Si is the matrix S with the row vectors having the same elements disregarded.

Effects of the Embodiment

Figure 9:
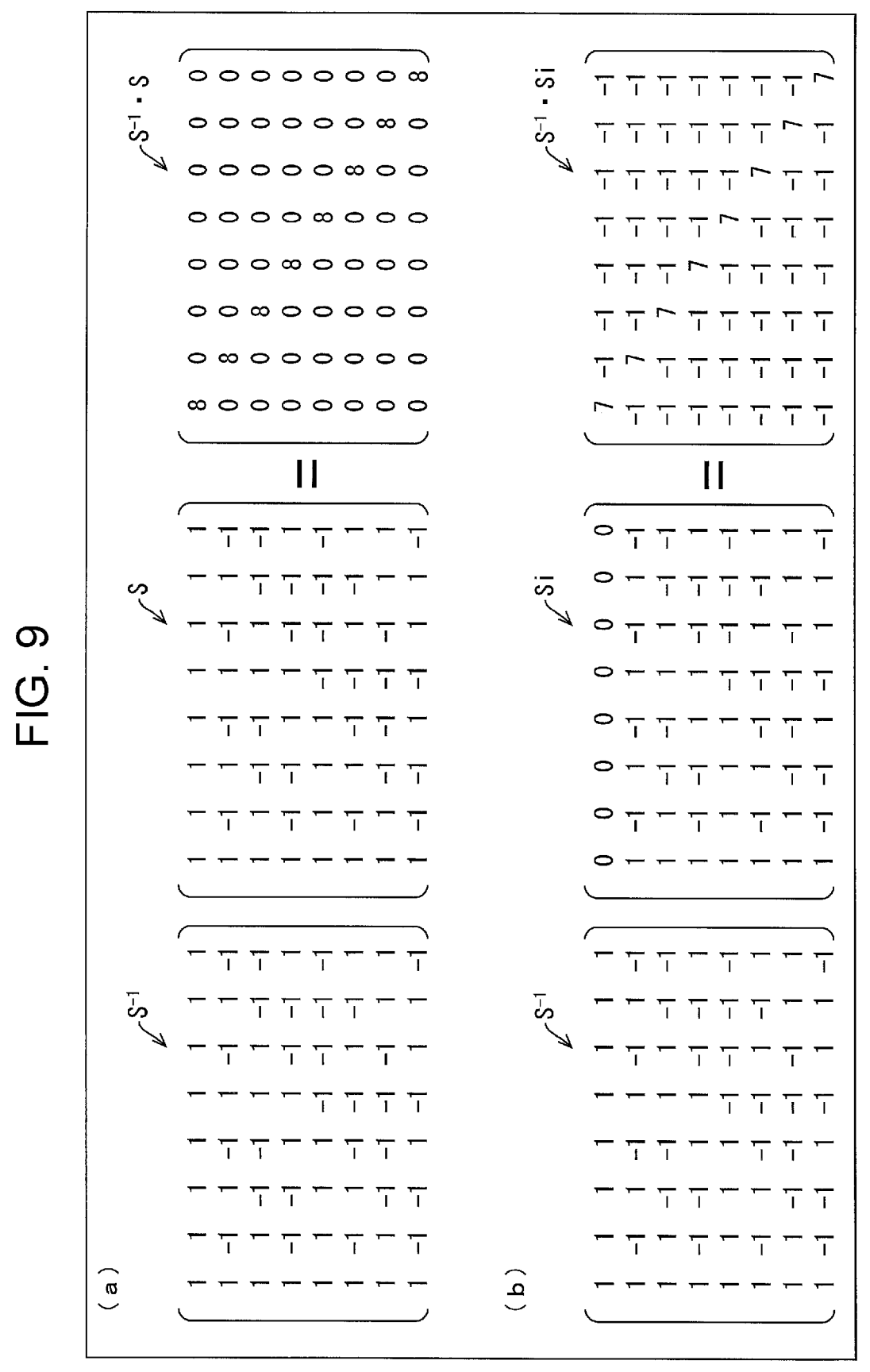

FIG. 9 illustrates the product of a matrix having as the elements thereof the detection codes of FIG. 8 and the inverse matrix of the matrix.

Referring to FIG. 9(a), the product of the inverse matrix $S^{-1}$ and the matrix S is 6 times as large as the unit matrix. As described above, when the sense lines are multiplexed, the product of the inverse matrix $S^{-1}$, the matrix S, and the matrix C is determined in the capacitance detection computation. In that case, the element at the first row and the first column of the matrix representing the product is determined to be 8 $C_{11}$.

Referring to FIG. 9(b), the product of the inverse matrix $Si^{-1}$ and the matrix S is not a scalar multiplication of the unit matrix. The element at the first row and the first column of the matrix representing the product of the inverse matrix $S^{-1}$, the matrix Si, and the matrix C is determined to be 7 $C_{11}-C_{21}-C_{31}-C_{41}-C_{51}-C_{61}-C_{71}-C_{81}$.

The element at the first row and the first column of a matrix representing a difference between the product of the inverse matrix $S^{-1}$, the matrix S, and the matrix C and the product of the inverse matrix $S^{-1}$, the matrix Si, and the matrix C is $C_{11}+C_{21}+C_{31}+C_{41}+C_{51}+C_{61}+C_{71}+C_{81}$. This represents an error in the capacitance detection calculation computation when a row vector having all equal elements of the matrix S is neglected.

The error is considered to have a smaller influence if the scalar multiplication of the unit matrix in the product of a matrix A representing the drive codes or the detection codes, and the inverse matrix $A^{-1}$ of the matrix A is larger (10 or more, for example). The effect of the detection codes that tend to saturate is to be removed. To this end, by neglecting the row vector having elements being equal to each other of the matrix having as the elements thereof the detection codes, the saturation is controlled without degrading the dynamic range of the amplification unit 12.

Embodiment 5

Configuration of Combining Drive Lines

Figure 10:
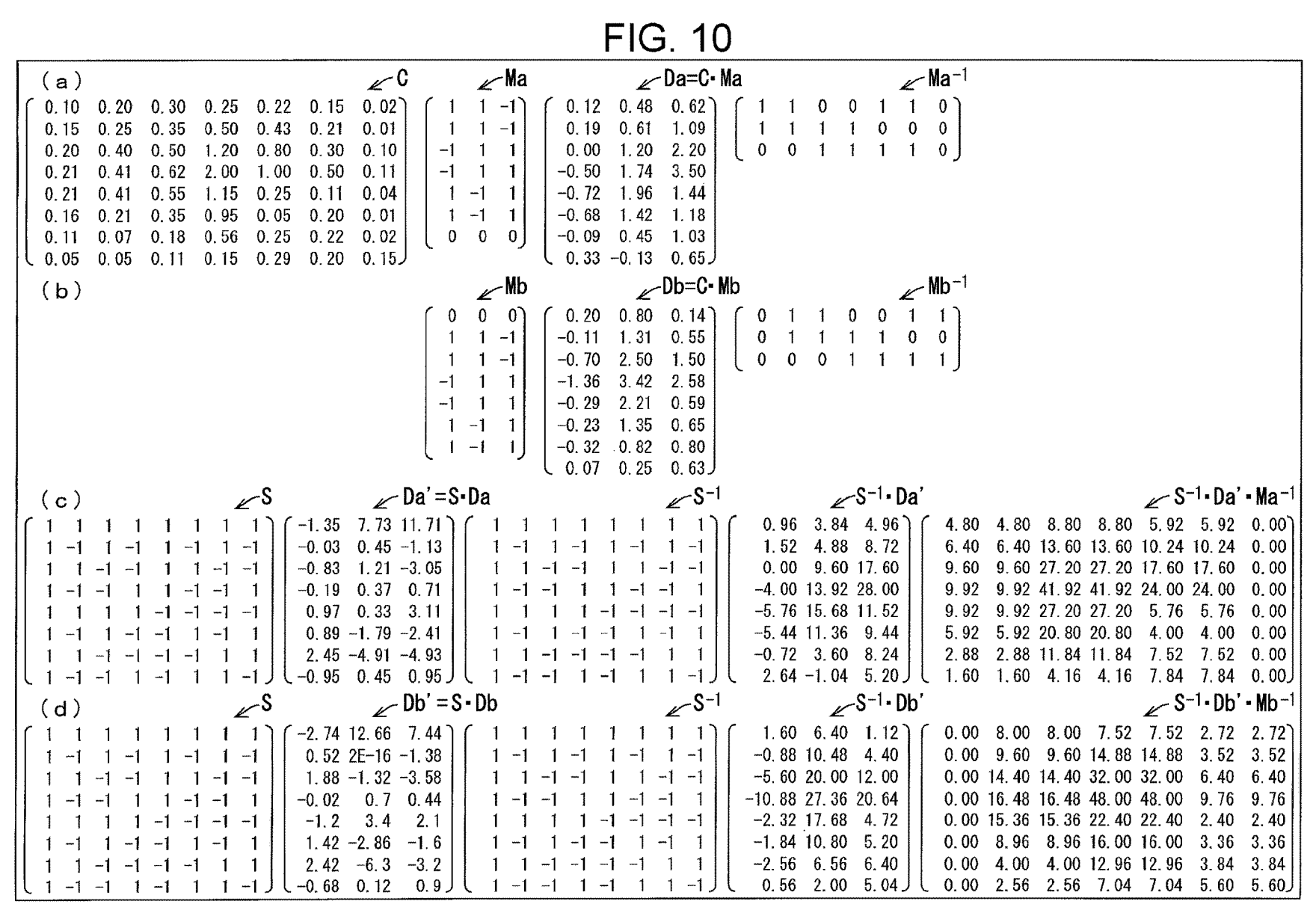

FIG. 10 illustrates an example of matrices having as elements thereof the drive codes used by the touch panel system 1 of Embodiment 5.

FIG. 10(a) illustrates a matrix C, a matrix Ma having as the elements thereof the drive codes, a matrix Da having the elements thereof the linear sum signals obtained from the sense lines S0 through S7 when the parallel driving is performed with the drive codes of the matrix Ma, and the inverse matrix $Ma^{-1}$ of the matrix Ma.

The first row vector of the matrix Ma is equal to the second row vector of the matrix Ma. This means that the drive circuit 4 drives the drive line D0 and the drive line D1 such that the drive line D0 and the drive line D0 are at the same potential. More specifically, the drive circuit 4 combines the drive lines D0 and D1. The drive circuit 4 also combines the drive lines D2 and D3. The drive circuit 4 also combines the drive lines D4 and D5.

FIG. 10(b) illustrates a matrix Mb different from the matrix Ma, a matrix Db having as the elements thereof as the linear sum signals obtained from the sense lines S0 through S7 when the parallel driving is performed in accordance with the drive codes of the matrix Mb, and the inverse matrix $Mb^{-1}$ of the matrix Mb.

The drive circuit 4 combines the drive lines D1 and D2. The drive circuit 4 also combines the drive lines D3 and D4. The drive circuit 4 also combines the drive lines D5 and D6.

FIG. 10(c) illustrates a matrix S, a matrix Da' having as the elements thereof the outputs of the amplification unit 12 when the drive lines are combined in accordance with the drive codes of the matrix Ma, the inverse matrix $S^{-1}$, the product of the inverse matrix $S^{-1}$ and the matrix Da', and the product of the inverse matrix $S^{-1}$, the matrix Da', and the inverse matrix $Ma^{-1}$.

FIG. 10(d) illustrates a matrix S, a matrix Db' having as the elements thereof the outputs of the amplification unit 12 obtained when the drive lines are combined in accordance with the drive codes of the matrix Mb, the inverse matrix $S^{-1}$ of the matrix S, the product of the inverse matrix $S^{-1}$ and the matrix Db', and the product of the inverse matrix $S^{-1}$, the matrix Db', and the inverse matrix $Mb^{-1}$.

Effects of the Embodiment

FIG. 11 illustrates products of matrices having the drive codes as the elements thereof illustrated in FIG. 10 and the inverse matrix of the matrix.

Referring to FIG. 11(a), the product of the matrix Ma and the inverse matrix $Ma^{-1}$ is not a scalar multiplication of the unit matrix. As described above, when the drive lines are driven in accordance with the drive codes of the matrix Ma in the parallel driving, the product of the matrix C, the matrix Ma, and the inverse matrix $Ma^{-1}$ is determined in the capacitance detection computation. The elements of the matrices representing the product are determined as listed below.

The element at the first row and the first column, and the element at the first row and the second column: $2C_{11} + 2C_{12}$ . . . (Element 1)

The element at the first row and the third column, and the element at the first row and the fourth column: $2C_{13} + 2C_{14}$ . . . (Element 2)

The element at the first row and the fifth column, and the element at the first row and the sixth column: $2C_{15} + 2C_{16}$ . . . (Element 3)

As illustrated in FIG. 11(b), the product of the matrix Mb and the inverse matrix $Mb^{-1}$ is not a scalar multiplication of the unit matrix. As described above, when the drive lines are driven in accordance with the drive codes of the matrix Mb in the parallel driving, the product of the matrix C, the matrix Mb, and the inverse matrix $Mb^{-1}$ is determined in the capacitance detection computation. The elements of the matrices representing the product are determined as listed below.

The element at the first row and the second column, and the element at the first row and the third column: $2C_{12} + 2C_{13}$ . . . (Element 4)

The element at the first row and the fourth column, and the element at the first row and the fifth column: $2C_{14} + 2C_{15}$ . . . (Element 5)

The element at the first row and the sixth column, and the element at the first row and the seventh column: $2C_{16} + 2C_{17}$ . . . (Element 6)

As a result of the above matrix computation, the capacitance component of the combination of drive lines detected through a combination of elements 1 through 6 is detected as $(C_{11}+C_{12})$, $(C_{12}+C_{13})$, $(C_{13}+C_{14})$, $(C_{14}+C_{15})$, $(C_{15}+C_{16})$, and $(C_{16}+C_{17})$. This is equivalent to enlarging the detection electrodes of the touch panel 2 in the direction in which the drive lines are arranged side by side. This configuration increases the signal quality of the touch panel 2 (signal intensity). When the drive lines are combined, shifting the drive lines to be combined may improve the signal quality of the touch panel 2 while the pitch of the direction in which the drive lines of the detection electrodes is arranged is maintained at the same time.

The above effect may be achieved when the drive circuit 4 combines at least one pair of the adjacent drive lines.

Embodiment 6

Configuration to Combine Sense Lines

FIG. 12 illustrates an example of matrices having as the elements there of the detection codes used by a touch panel system 1 of Embodiment 6.

FIG. 12(a) illustrates a matrix Sa having the elements thereof the detection codes, a matrix Dsa' having as the elements thereof the linear sum signals obtained from the outputs of the amplification unit 12 when the sense lines are multiplexed in accordance with the detection codes of the matrix Sa, the inverse matrix $Sa^{-1}$ of the matrix Sa, the product of the inverse matrix $Sa^{-1}$ and the matrix Dsa', and the product of the inverse matrix $Sa^{-1}$, the matrix Dsa', and the inverse matrix $M^{-1}$.

The first column vector and the second column vector of the matrix Sa are identical to each other. This means that the code multiplication unit 11 multiplexes the sense lines S0 and S1 such that the sense lines S0 and S1 are connected to the same connection terminal of the operational amplifier 121. More specifically, the code multiplication unit 11 combines the sense lines S0 and S0. The code multiplication unit 11 also combines the sense lines S2 and S3. The code multiplication unit 11 also combines the sense lines S4 and S5. The code multiplication unit 11 also combines the sense lines S6 and S7.

FIG. 12(b) illustrates a matrix Sb having the elements thereof the detection codes, a matrix Dsb' having as the elements thereof the linear sum signals obtained from the outputs of the amplification unit 12 when the sense lines are multiplexed in accordance with the detection codes of the matrix Sb, the inverse matrix $Sb^{-1}$ of the matrix Sb, the product of the inverse matrix $Sb^{-1}$ and the matrix Dsb', and the product of the matrix of the inverse matrix $Sb^{-1}$, the matrix Dsb', and the inverse matrix $M^{-1}$.

The second column vector and the third column vector of the matrix Sb are identical to each other. This means that the code multiplication unit 11 multiplexes the sense lines S1 and S2 such that the sense lines S1 and S2 are connected to the same connection terminal of the operational amplifier 121. More specifically, the code multiplication unit 11 combines the sense lines S1 and S2. The code multiplication unit 11 also combines the sense lines S3 and S4. The code multiplication unit 11 also combines the sense lines S5 and S6. The code multiplication unit 11 also combines the sense lines S0 and S7.

Effects of the Embodiment

FIG. 13 illustrates products of matrices having the detection codes as the elements thereof illustrated in FIG. 12 and the inverse matrix of the matrix.

Referring to FIG. 13(a), the product of the inverse matrix $Sa^{-1}$ and the matrix Sa is not a scalar multiplication of the unit matrix. As described above, when the sense lines are multiplexed in accordance with the detection codes of the matrix Sa, the product of the inverse matrix $Sa^{-1}$, the matrix Sa, and the matrix C is determined in the capacitance detection computation. The elements of the matrices representing the product are determined as listed below.

The element at the first row and the first column, and the element at the second row and the first column: $4C_{11} + 4C_{22}$ . . . (Element 1)

The element at the third row and the first column, and the element at the fourth row and the first column: $4C_{31} + 4C_{41}$ . . . (Element 2)

The element at the fifth row and the first column, and the element at the sixth row and the first column: $4C_{51}+4C_{61}$ ... (Element 3)

The element at the seventh row and the first column, and the element at the eighth row and the first column: $4C_{71}+4C_{81}$ ... (Element 4)

As illustrated in FIG. 13(b), the product of the inverse matrix $Sb^{-1}$ and the matrix Sb is not a scalar multiplication of the unit matrix. As described above, when the sense lines are multiplexed in accordance with the detection codes of the matrix Sb in the parallel driving, the product of the inverse matrix $Sb^{-1}$, the matrix Sb, and the matrix C is determined in the capacitance detection computation. The elements of the matrices representing the product are determined as listed below.

The element at the first row and the first column, and the element at the eighth row and the first column: $4C_{11}+4C_{81}$ ... (Element 5)

The element at the second row and the first column, and the element at the third row and the first column: $4C_{21}+4C_{31}$ ... (Element 6)

The element at the fourth row and the first column, and the element at the fifth row and the first column: $4C_{41}+4C_{51}$ ... (Element 7)

The element at the sixth row and the first column, and the element at the seventh row and the first column: $4C_{61}+4C_{71}$ ... (Element 8)

As a result of the above matrix computation, the capacitance component of the combination of sense lines detected through a combination of elements 1 through 8 is detected as $(C_{11}+C_{21})$, $(C_{21}+C_{31})$, $(C_{31}+C_{41})$, $(C_{41}+C_{51})$, $(C_{51}+C_{61})$, $(C_{61}+C_{71})$, and $(C_{71}+C_{81})$. This is equivalent to enlarging the detection electrodes of the touch panel 2 in the direction in which the sense lines are arranged side by side. This configuration increases the signal quality of the touch panel 2 (signal intensity). When the sense lines are combined, shifting the sense lines to be combined may improve the signal quality of the touch panel 2 while the pitch of the direction in which the sense lines of the detection electrodes are arranged is maintained at the same time.

The above effects may be achieved when the code multiplication unit 11 combines at least one pair of the adjacent sense lines.

Embodiment 7

Configuration to Combine Drive Lines and Sense Lines

FIG. 14 illustrates an example of matrices having as the elements thereof the drive codes and matrices having as the elements thereof the detection codes used by a touch panel system 1 of Embodiment 7.

FIG. 14(a) illustrates a matrix Sa, a matrix Daa' having as the elements thereof the linear sum signals obtained from the outputs of the amplification unit 12 when the parallel driving is performed with the drive codes of the matrix Ma and the sense lines are multiplexed in accordance with the detection codes of a matrix Sa, the inverse matrix $Sa^{-1}$, the product of the inverse matrix $Sa^{-1}$ and the matrix Daa', and the product of the inverse matrix $Sa^{-1}$, the matrix Daa', and the inverse matrix $Ma^{-1}$.

FIG. 14(b) illustrates a matrix Sa, a matrix Dab' having as the elements thereof the linear sum signals obtained from the outputs of the amplification unit 12 when the parallel driving is performed in accordance with the dive codes of the matrix Mb and the sense lines are multiplexed in accordance with the detection codes of the matrix Sa, the inverse matrix $Sa^{-1}$, the product of the inverse matrix $Sa^{-1}$ and the matrix Dab', and the product of the matrix of the inverse matrix $Sa^{-1}$, the matrix Dab', and the inverse matrix $Mb^{-1}$.

FIG. 14(c) illustrates a matrix Sb, a matrix Dba' having as the elements thereof the linear sum signals obtained from the outputs of the amplification unit 12 when the parallel driving is performed in accordance with the dive codes of a matrix Ma and the sense lines are multiplexed in accordance with the detection codes of the matrix Sb, the inverse matrix $Sb^{-1}$, the product of the inverse matrix $Sb^{-1}$ and the matrix Dba', and the product of the matrix of the inverse matrix $Sb^{-1}$, the matrix Dba', and the inverse matrix $Ma^{-1}$.

FIG. 14(d) illustrates a matrix Sb, a matrix Dbb' having as the elements thereof the linear sum signals obtained from the outputs of the amplification unit 12 when the parallel driving is performed in accordance with the dive codes of the matrix Mb and the sense lines are multiplexed in accordance with the detection codes of the matrix Sb, the inverse matrix $Sb^{-1}$, the product of the inverse matrix $Sb^{-1}$ and the matrix Dbb', and the product of the matrix of the inverse matrix $Sb^{-1}$, the matrix Dbb', and the inverse matrix $Mb^{-1}$.

Effects of the Embodiment

With the configuration described above, the effect of combining the drive lines and the effect of combining the sense lines are both achieved. The effects are achieved when the drive circuit 4 combines at least one pair of adjacent drive lines and the code multiplication unit 11 combines at least one pair of sense lines.

Embodiment 8

Figure 15:
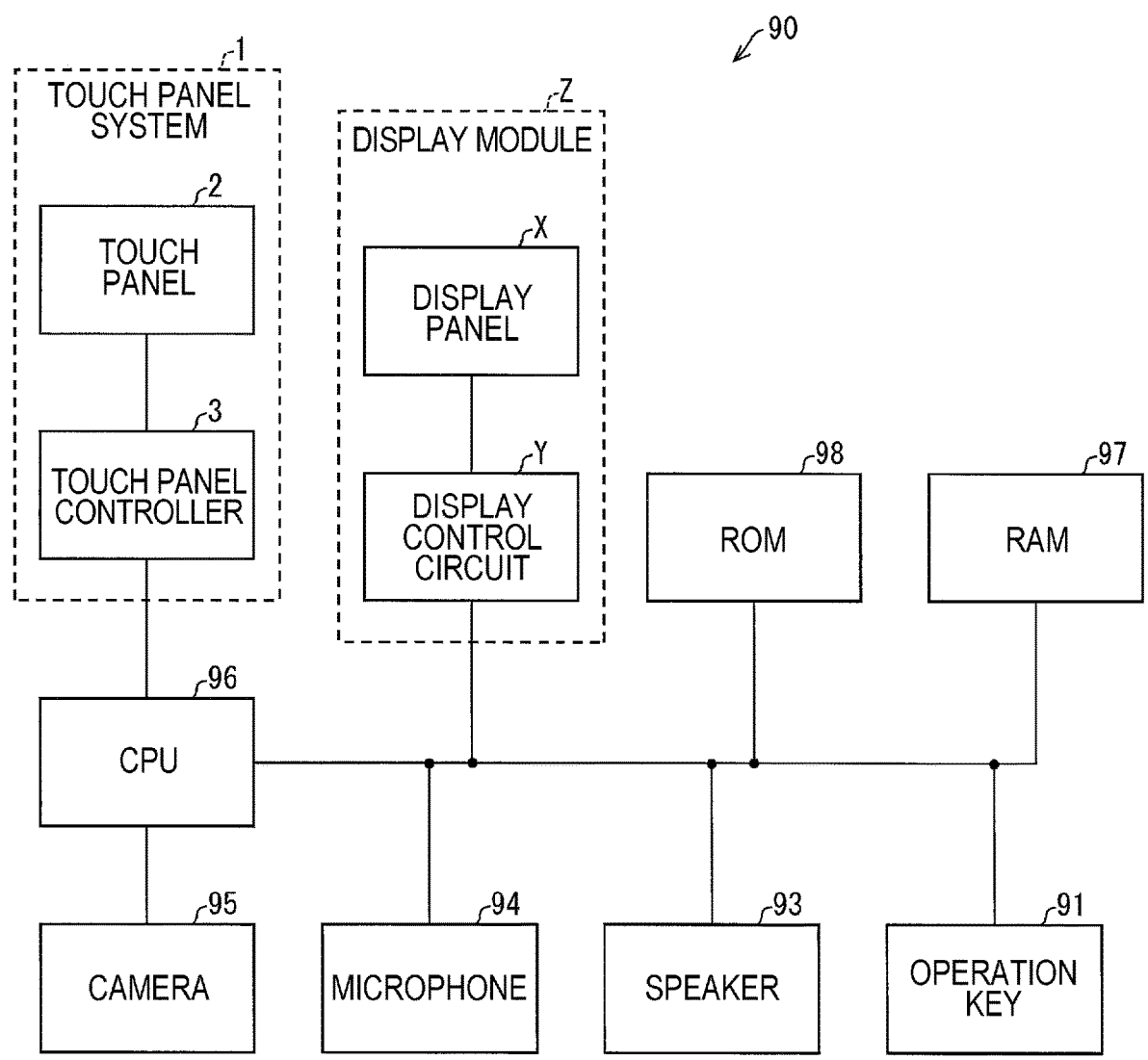
FIG. 15 is a block diagram illustrating a configuration of a mobile phone (electronic apparatus) of Embodiment 8.

FIG. 15 is a block diagram illustrating a configuration of a mobile phone 90 (electronic apparatus) of Embodiment 8. For convenience of explanation, elements identical in functionality to those described with reference to the embodiments are designated with the same reference numerals and the discussion thereof is omitted herein.

The mobile phone 90 includes a CPU 96, a RAM 97, a ROM 98, a camera 95, a microphone 94, a speaker 93, an operation key 91, a display module Z including a display panel X and a display control circuit Y, and the touch panel system 1. These elements are interconnected to each via a data bus.

The CPU 96 controls the operation of the mobile phone 90. The CPU 96 executes a program stored on the ROM 98, for example. The operation key 91 receives an instruction input by a user of the mobile phone 90. The RAM 97 stores, in a volatile fashion, data generated when the CPU 96 executes the program, and data input via the operation key 91. The ROM 98 also stores data in a non-volatile fashion.

The ROM 98 is a ROM that permits data to be written and erased, and is an EPROM (Erasable Programmable Read-Only Memory) or a flash memory. The mobile phone 90 may include an interface (IF) that is used to wiredly connect the mobile phone 90 to another electronic device, though the IF is not illustrated in FIG. 15.

The camera 95 photographs a subject in response to an operation of the user performed on the operation key 91. Image data of the photographed subject is stored on the RAM 97 or an external memory (such as a memory card). The microphone 94 receives a voice of the user. The mobile phone 90 digitizes the input voice (analog data). The mobile phone 90 then transmits the voice in the form of digital data to a communication partner (such as another mobile phone).

The speaker 93 outputs a sound in response to music data or the like stored on the RAM 97.

The touch panel system 1 includes the touch panel 2 and the touch panel controller 3. The CPU 96 controls the operation of the touch panel system 1. The CPU 96 executes a program stored on the ROM 98. The RAM 97 stores, in a volatile fashion, data generated when the CPU 96 executes the program. The ROM 98 stores the data in a non-volatile fashion.

The display panel X displays images stored on the ROM 98 and the RAM 97 through the display control circuit Y. The display panel X may be overlaid on the touch panel 2 or includes the touch panel 2.

CONCLUSION

According to a first aspect of the invention, the touch panel controller 3 controls the touch panel 2 that detects a capacitance or a change in the capacitance between the multiple electrodes (the touch detection electrodes E) and the touch detection target, the electrodes being arranged at intersection points of the multiple first signal lines and the multiple second signal lines (the drive lines D0 through D(K−1) and the sense lines S0 through S(M−1)). The touch panel controller 3 includes the drive circuit 4 that turns on the first switch element (the drive switch element DT) between each of the electrodes and at least two of the first signal lines and drives the first signal lines multiple times in accordance with the first code series as the vector having elements of the number equal to the number of the first signal lines, the code multiplication unit 11 that turns on the second switch element (the sense switch element ST) between each of the electrodes and corresponding one of the second signal lines, reads the multiple linear sum signals responsive to charges of electrodes along the second signal lines, and performs multiple times the inner product computation on the vector having as the elements the linear sum signals and the second code series as the vector having the elements of the number equal to the number of the second signal lines, and the detection circuit 6 that detects the capacitance or the change in the capacitance by calculating the product of the inverse matrix of the matrix that is obtained by arranging the vectors, each vector representing the second code series, the matrix that is obtained by arranging the vectors, each vector including the multiple linear sum signals, and the inverse matrix of the matrix that is obtained by arranging the vectors, each vector representing the first code series.

If the touch panel having the first switch elements and the second switch elements on the touch detection electrodes is parallel-driven in the above-described configuration, the touch panel is scanned for a short period of time due to a simple structure. The sense lines are multiplexed when the code multiplication unit performs the inner product computation on the multiple linear sum signals and the second code series. Accordingly, the number of amplifier elements to amplify the sense line signal may be reduced.

The amplifier element may be mounted beneath the touch detection electrode on the touch panel, for example. By reducing the number of amplifier elements, a chip having the capacitance detection computation functionality and the like may be mounted beneath the touch detection electrode, for example. Accordingly, the touch panel system may be constructed in a configuration simpler than that of the related art.

Therefore, the touch panel system using a touch panel of the self-capacitance touch method may detect the capacitance or the change in the capacitance between the touch detection electrode of the simple structured touch panel and the touch detection target.

In the touch panel controller of a second aspect of the invention in view of the first aspect, a capacitance equal in value to a capacitance difference between a first capacitance between a first electrode of the multiple electrodes and the touch detection target and a second capacitance between a second electrode of the electrodes and the touch detection target may be desirably connected in parallel with one of the first capacitance and the second capacitance, the one being lower in value than the other.

In the touch panel controller of a third aspect of the present invention in view of the first aspect, the drive circuit may drive the first signal lines in accordance with a code series that is balanced such that a difference between the number of elements "1" and the number of elements "−1" at an i-th column of the code series (1≤i≤N) becomes close to 0. The code series includes the element. "1" for driving the first signal line with a first potential shifted from a reference potential, and the element "−1" for driving the first signal line with a second potential shifted from the reference potential or another reference potential.

In the touch panel controller of a fourth aspect of the present invention in view of the first aspect, the code multiplication unit may desirably perform the inner product computation on the multiple linear sum signals and the second code series by using an integral capacitance that is variable in value.

In the touch panel controller of a fifth aspect of the present invention in view of the first aspect, when the elements of the vector representing the second code series are identical to each other, the code multiplication unit may desirably substitute 0 for each of the elements.

In the touch panel controller of a sixth aspect of the present invention in view of the first aspect, the code multiplication unit may desirably include a third switch element (switch element SW) that opens or closes in response to the second code series. At least one of the first switch element, the second switch element, and the third switch element includes an N-type transistor SWn and a P-type transistor SWp identical to each other in size. The drain terminal of the N-type transistor may be desirably connected to the drain terminal of the P-type transistor. The source terminal of the N-type transistor may be desirably connected to the source terminal of the P-type transistor.

In the touch panel controller of a seventh aspect of the present invention in view of the first aspect, the code multiplication unit may desirably equalize at least a pair of first code series, each of which is the first code series, corresponding to adjacent two of the first signal lines or at least a pair of second code series, each of which is the second code series, corresponding to adjacent two of the second signal lines.

In the touch panel controller of an eighth aspect of the present invention, in view of one of the first through seventh aspects, the touch panel may be a fingerprint sensor.

An electronic apparatus (the mobile phone 90) of a ninth aspect of the present invention includes the touch panel controller according to one of the first through eighth aspects.

The capacitance detection method of a tenth aspect of the present invention detects the capacitance or the change in the capacitance between the multiple electrodes and the touch detection target, the electrodes being arranged at intersection points of the multiple first sig al lines and the multiple second signal lines. The capacitance detection method includes a drive step of turning on the first switch element between each electrode and at least two of the first signal lines and driving the first signal lines multiple times in accordance with the first code series as the vector having elements of the number equal to the number of the first signal lines, a code multiplication step of, subsequent to the drive step, turning on the second switch element between each electrode and corresponding one of the second signal lines, reading the multiple linear sum signals responsive to the charges of the electrodes along the second signal lines, and performing multiple times the inner product computation on the vector having as elements the linear sum signals and the second code series as the vector having elements of the number equal to the number of the second signal lines, and a detection step of, subsequent to the code multiplication step, detecting the capacitance or the change in the capacitance by calculating the product of the inverse matrix of the matrix that is obtained by arranging vectors, each vector representing the second code series, the matrix that is obtained by arranging vectors, each vector including the multiple linear sum signals, and the inverse matrix of the matrix that is obtained by arranging vectors, each vector representing the first code series.

A position detection method of an eleventh aspect of the present invention detects the position of the touch detection target on the touch panel that detects the capacitance or the change in the capacitance between the multiple electrodes and the touch detection target, the electrodes being arranged at intersection points of the multiple first signal lines and the multiple second signal lines. The position detection method includes the steps of the capacitance detection method according to toe tenth aspect, and a position detection step of detecting the position of the touch detection target on the touch panel in response to the capacitance or the change in the capacitance detected in the detection step.

APPENDIX

The present invention is not limited to the embodiments, and a variety of changes within the scope defined by the claims may be made to the embodiments. An embodiment resulting from appropriately combining technical means disclosed in different embodiments falls within the technical scope of the present invention. A new technical feature may be created by combining the technical means disclosed in the embodiments.

REFERENCE SIGNS LIST

1 Touch panel system
2 Touch panel
3 Touch panel controller
4 Drive circuit (drive step)
6 Detection circuit (detection step; position detection step)
8 Switch element control circuit
11 Code multiplication unit (code multiplication step)
90 Mobile phone (electronic apparatus)
D0 through D(K−1) Drive lines (first signal lines)
DS0 through DS(K−1) Drive control lines
DT Drive switch element (first switch element)
E Detection electrode (touch detection electrode)
S0 through S(M−1) Sense lines (second signal lines)
SS0 through SS(K−1) Sense control lines
ST Sense switch element (second switch element)
SW Switch element (third switch element)
SWn N-type transistor
SWp P-type transistor

The invention claimed is:

1. A touch panel controller configured to control a touch panel that detects a capacitance or a change in the capacitance between a plurality of electrodes and a touch detection target, the electrodes being arranged at intersection points of a plurality of first signal lines and a plurality of second signal lines, the touch panel controller comprising:

a drive circuit that turns on a first switch element between each of the electrodes and at least two of the first signal lines and drives the first signal lines a plurality of times in accordance with a first code series as a vector having elements of a number equal to a number of the first signal lines, a code multiplication unit that turns on a second switch element between each of the electrodes and corresponding one of the second signal lines, reads a plurality of linear sum signals responsive to charges of the electrodes along the second signal lines, and performs a plurality of times an inner product computation on a vector having as elements the linear sum signals and a second code series as a vector having elements of a number equal to a number of the second signal lines, and a detection circuit that detects the capacitance or the change in the capacitance by calculating a product of an inverse matrix of a matrix that is obtained by arranging a plurality of vectors, each vector representing the second code series, a matrix that is obtained by arranging vectors, each vector including the plurality of linear sum signals, and an inverse matrix of a matrix that is obtained by arranging a plurality of vectors, each vector representing the first code series.

2. The touch panel controller according to claim 1, wherein
a capacitance equal in value to a capacitance difference between a first capacitance between a first electrode of the electrodes and the touch detection target and a second capacitance between a second electrode of the electrodes and the touch detection target is connected in parallel with one of the first capacitance and the second capacitance, the one being lower in value than the other.

3. The touch panel controller according to claim 1, wherein
the drive circuit drives the first signal lines in accordance with a code series that is balanced such that a difference between a number of elements "1" and a number of elements "−1" at an i-th column of the code series ($1 \leq i \leq N$) becomes close to 0, the code series including the element "1" for driving the first signal line with a first potential shifted from a reference potential, and the element "−1" for driving the first signal line with a second potential shifted from the reference potential or another reference potential.

4. The touch panel controller according to claim 1, wherein
the code multiplication unit performs the inner product computation on the linear sum signals and the second code series by using an integral capacitance that is variable in value.

5. The touch panel controller according to claim 1, wherein
when the elements of the vector representing the second code series are identical to each other, the code multiplication unit substitutes 0 for each of the elements.

6. The touch panel controller according to claim 1, wherein
the code multiplication unit comprises a third switch element that opens or closes in response to the second code series,
at least one of the first switch element, the second switch element, and the third switch element includes an N-type transistor and a P-type transistor identical to each other in size,
a drain terminal of the N-type transistor is connected to a drain terminal of the P-type transistor, and
a source terminal of the N-type transistor is connected to a source terminal of the P-type transistor.

7. The touch panel controller according to claim 1, wherein
the code multiplication unit equalizes at least a pair of first code series, each of which is the first code series, corresponding to adjacent two of the first signal lines or at least a pair of second code series, each of which is the second code series, corresponding to adjacent two of the second signal lines.

8. The touch panel controller according to claim 1, wherein the touch panel is a fingerprint sensor.

9. An electronic apparatus comprising the touch panel controller according to claim 1.

10. A capacitance detection method of detecting a capacitance or a change in the capacitance between a plurality of electrodes and a touch detection target, the electrodes being arranged at intersection points of a plurality of first signal lines and a plurality of second signal lines, the capacitance detection method comprising:
a drive step of turning on a first switch element between each of the electrodes and at least two of the first signal lines and driving the first signal lines a plurality of times in accordance with a first code series as a vector having elements of a number equal to a number of the first signal lines,
a code multiplication step of, subsequent to the drive step, turning on a second switch element between each of the electrodes and corresponding one of the second signal lines, reading a plurality of linear sum signals responsive to charges of the electrodes along the second signal lines, and performing a plurality of times an inner product computation on a vector having as elements the linear sum signals and a second code series as a vector having elements of a number equal to a number of the second signal lines, and
a detection step of, subsequent to the code multiplication step, detecting the capacitance or the change in the capacitance by calculating a product of an inverse matrix of a matrix that is obtained by arranging vectors, each vector representing the second code series, a matrix that is obtained by arranging vectors, each vector including the plurality of linear sum signals, and an inverse matrix of a matrix that is obtained by arranging vectors, each vector representing the first code series.

11. A position detection method of detecting a position of a touch detection target on a touch panel that detects a capacitance or a change in the capacitance between a plurality of electrodes and the touch detection target, the electrodes being arranged at intersection points of a plurality of first signal lines and a plurality of second signal lines, the position detection method comprising:
the steps of the capacitance detection method according to claim 10, and
a position detection step of detecting the position of the touch detection target on the touch panel in response to the capacitance or the change in the capacitance detected in the detection step.

* * * * *